US011561914B2

United States Patent
Cha et al.

(10) Patent No.: US 11,561,914 B2
(45) Date of Patent: Jan. 24, 2023

(54) STORAGE DEVICE AND INTERRUPT GENERATION METHOD THEREOF

(71) Applicant: SAMSUNG ELECTRONICS CO., LTD., Suwon-si (KR)

(72) Inventors: Hyunseok Cha, Osan-si (KR); Sarath Kumar Kunnumpurathu Sivan, Bangalore-Karnat (IN); Jungsoo Ryoo, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/071,411

(22) Filed: Oct. 15, 2020

(65) Prior Publication Data

US 2021/0049120 A1 Feb. 18, 2021

Related U.S. Application Data

(63) Continuation of application No. 15/265,090, filed on Sep. 14, 2016, now abandoned.

(30) Foreign Application Priority Data

Sep. 14, 2015 (KR) .......................... 10-2015-0129396

(51) Int. Cl.
G06F 13/24 (2006.01)
G06F 3/06 (2006.01)
(52) U.S. Cl.
CPC .............. *G06F 13/24* (2013.01); *G06F 3/061* (2013.01); *G06F 3/0655* (2013.01); *G06F 3/0688* (2013.01)

(58) Field of Classification Search
None
See application file for complete search history.

(56) References Cited

U.S. PATENT DOCUMENTS 6,055,579 A * 4/2000 Goyal ................... G06F 9/4881
712/28
6,065,089 A * 5/2000 Hickerson ............. G06F 9/4825
710/48

(Continued)

OTHER PUBLICATIONS

Office Action dated Feb. 22, 2018 in Corresponding U.S. Appl. No. 15/265,090.

(Continued)

*Primary Examiner* — Elias Mamo
(74) *Attorney, Agent, or Firm* — F. Chau & Associates, LLC

(57) ABSTRACT

An interrupt generation method of a storage device includes executing a command provided by a host, writing a completion entry in a completion queue of the host upon completing execution of the command, and issuing an interrupt corresponding to the completion entry to the host in response to at least one of a first interrupt generation condition, a second interrupt generation condition, and a third interrupt generation condition being satisfied. The first interrupt generation condition is satisfied when a difference between a tail pointer and a head pointer of the completion queue is equal to a first mismatch value. The second interrupt generation condition is satisfied when the difference between the tail pointer and the head pointer is at least equal to an aggregation threshold. The third interrupt generation condition is satisfied when an amount of time that has elapsed since a previous interrupt was issued exceeds a reference time.

16 Claims, 20 Drawing Sheets

(56) References Cited

U.S. PATENT DOCUMENTS

| | | | |
|---|---|---|---|
| 6,088,740 A | 7/2000 | Ghaffari et al. | |
| 6,145,061 A * | 11/2000 | Garcia | G06F 5/06 |
| | | | 710/54 |
| 6,363,438 B1 | 3/2002 | Williams et al. | |
| 6,895,460 B2 * | 5/2005 | Desoli | G06F 9/45504 |
| | | | 710/262 |
| 7,277,447 B2 * | 10/2007 | Wang | H04J 3/0623 |
| | | | 370/412 |
| 7,679,133 B2 | 3/2010 | Son et al. | |
| 8,103,815 B2 | 1/2012 | Ganguly | |
| 8,244,946 B2 | 8/2012 | Gupta et al. | |
| 8,553,466 B2 | 10/2013 | Han et al. | |
| 8,554,968 B1 * | 10/2013 | Onufryk | G06F 13/24 |
| | | | 710/48 |
| 8,559,235 B2 | 10/2013 | Yoon et al. | |
| 8,654,587 B2 | 2/2014 | Yoon et al. | |
| 8,868,809 B2 | 10/2014 | Noeldner et al. | |
| 8,924,605 B2 | 12/2014 | Hayut et al. | |
| 8,935,453 B2 | 1/2015 | Debendra | |
| 2002/0174166 A1 | 11/2002 | Ang | |
| 2006/0184949 A1 | 8/2006 | Craddock et al. | |
| 2008/0091868 A1 | 4/2008 | Mizrachi et al. | |
| 2010/0241778 A1 | 9/2010 | Sakakura et al. | |
| 2011/0233648 A1 | 9/2011 | Seol et al. | |
| 2013/0024595 A1 | 1/2013 | Subramaniyan et al. | |
| 2014/0095851 A1 * | 4/2014 | Gerwig | G06F 9/528 |
| | | | 712/244 |
| 2014/0173149 A1 | 6/2014 | Walker et al. | |
| 2014/0344492 A1 | 11/2014 | Patwa et al. | |
| 2016/0132237 A1 * | 5/2016 | Jeong | G06F 3/061 |
| | | | 711/103 |
| 2017/0075834 A1 | 3/2017 | Cha et al. | |

OTHER PUBLICATIONS

Office Action dated Aug. 27, 2018 in Corresponding U.S. Appl. No. 15/265,090.

Final Office Action dated Mar. 7, 2019 in Corresponding U.S. Appl. No. 15/265,090.

Office Action dated Sep. 18, 2019 in Corresponding U.S. Appl. No. 15/265,090.

Final Office Action dated Apr. 16, 2020 in Corresponding U.S. Appl. No. 15/265,090.

* cited by examiner

STORAGE DEVICE AND INTERRUPT GENERATION METHOD THEREOF

CROSS-REFERENCE TO RELATED APPLICATIONS

This application is a continuation of U.S. patent application Ser. No. 15/265,090 filed Sep. 14, 2016, which claims priority under 35 U.S.C. § 119 to Korean Patent Application No. 10-2015-0129396 filed on Sep. 14, 2015, the disclosures of which are incorporated by reference herein in their entirety.

TECHNICAL FIELD

Exemplary embodiments of the inventive concept relate to a semiconductor memory device, and more particularly, to a storage device and an interrupt generation method thereof.

DISCUSSION OF THE RELATED ART

A flash memory device is often used in electronic devices such as, for example, a computer, a smartphone, a personal digital assistant (PDA), a digital camera, a voice recorder, an MP3 player, a handheld PC, etc. An example of a flash memory device is a solid state drive (SSD). An SSD is commonly used in devices such as, for example, a server, a client, a data center, etc. Serial AT Attachment (SATA), PCI Express (PCIe), Serial Attached SCSI (SAS), and NVM Express (NVMe) are common interfaces used for an SSD. Host equipment including an SSD may include various computer systems. For example, an SSD may be connected to a server, a data center, a personal computer (PC), etc. In this case, overhead of the host equipment may be caused by the frequent occurrence of interrupts, which may occur when, for example, the performance of the host equipment is relatively low, or a relatively high number of applications are driven on the host equipment.

SUMMARY

Exemplary embodiments of the inventive concept provide a storage device which reduces an interrupt generation frequency, and an interrupt generation method thereof.

According to an exemplary embodiment of the inventive concept, an interrupt generation method of a storage device includes executing a command provided by a host, writing a completion entry in a completion queue of the host upon completing execution of the command, and issuing an interrupt corresponding to the completion entry to the host in response to at least one of a first interrupt generation condition, a second interrupt generation condition, and a third interrupt generation condition being satisfied. The first interrupt generation condition is satisfied when a difference between a tail pointer and a head pointer of the completion queue is equal to a first mismatch value. The second interrupt generation condition is satisfied when the difference between the tail pointer and the head pointer is at least equal to an aggregation threshold. The third interrupt generation condition is satisfied when an amount of time that has elapsed since a previous interrupt was issued exceeds a reference time.

According to an exemplary embodiment of the inventive concept, a storage device includes a nonvolatile memory device and a storage controller configured to control the nonvolatile memory device. The storage controller executes a command provided by a host, sends a completion entry to the host upon executing the command, and issues an interrupt corresponding to the completion entry to the host. The storage controller issues the interrupt to the host in response to at least one of a first interrupt generation condition, a second interrupt generation condition, and a third interrupt generation condition being satisfied. The first interrupt generation condition is satisfied when a difference between a tail pointer and a head pointer of a completion queue of the host in which the completion entry is stored is equal to a first mismatch value. The second interrupt generation condition is satisfied when the difference between the tail pointer and the head pointer is at least equal to an aggregation threshold. The third interrupt generation condition is satisfied when an amount of time that has elapsed since a previous interrupt was issued exceeds a reference time.

According to an exemplary embodiment of the inventive concept, an interrupt issuing method of a solid state drive (SSD) includes writing a completion entry at a completion queue of a host, determining whether to issue an interrupt corresponding to the completion queue based on a number of completion entries accumulated in the completion queue or an amount of time that has elapsed since a previous interrupt was issued, and sending the interrupt to the host based on a result of the determination.

According to an exemplary embodiment of the inventive concept, an interrupt issuing method of a solid state drive (SSD) includes writing a completion entry at a completion queue of a host, determining whether to issue an interrupt corresponding to the completion queue based on at least one of a first interrupt generation condition indicating whether a difference between a tail pointer and a head pointer of the completion queue is equal to a first mismatch value, a second interrupt generation condition indicating whether the difference between the tail pointer and the head pointer is at least equal to an aggregation threshold, and a third interrupt generation condition indicating whether an amount of time that has elapsed since a previous interrupt was issued exceeds a reference time, and sending the interrupt to the host based on a result of the determination.

BRIEF DESCRIPTION OF THE DRAWINGS

The above and other features of the present inventive concept will become more apparent by describing in detail exemplary embodiments thereof with reference to the accompanying drawings, in which.

DETAILED DESCRIPTION

Figure 1:
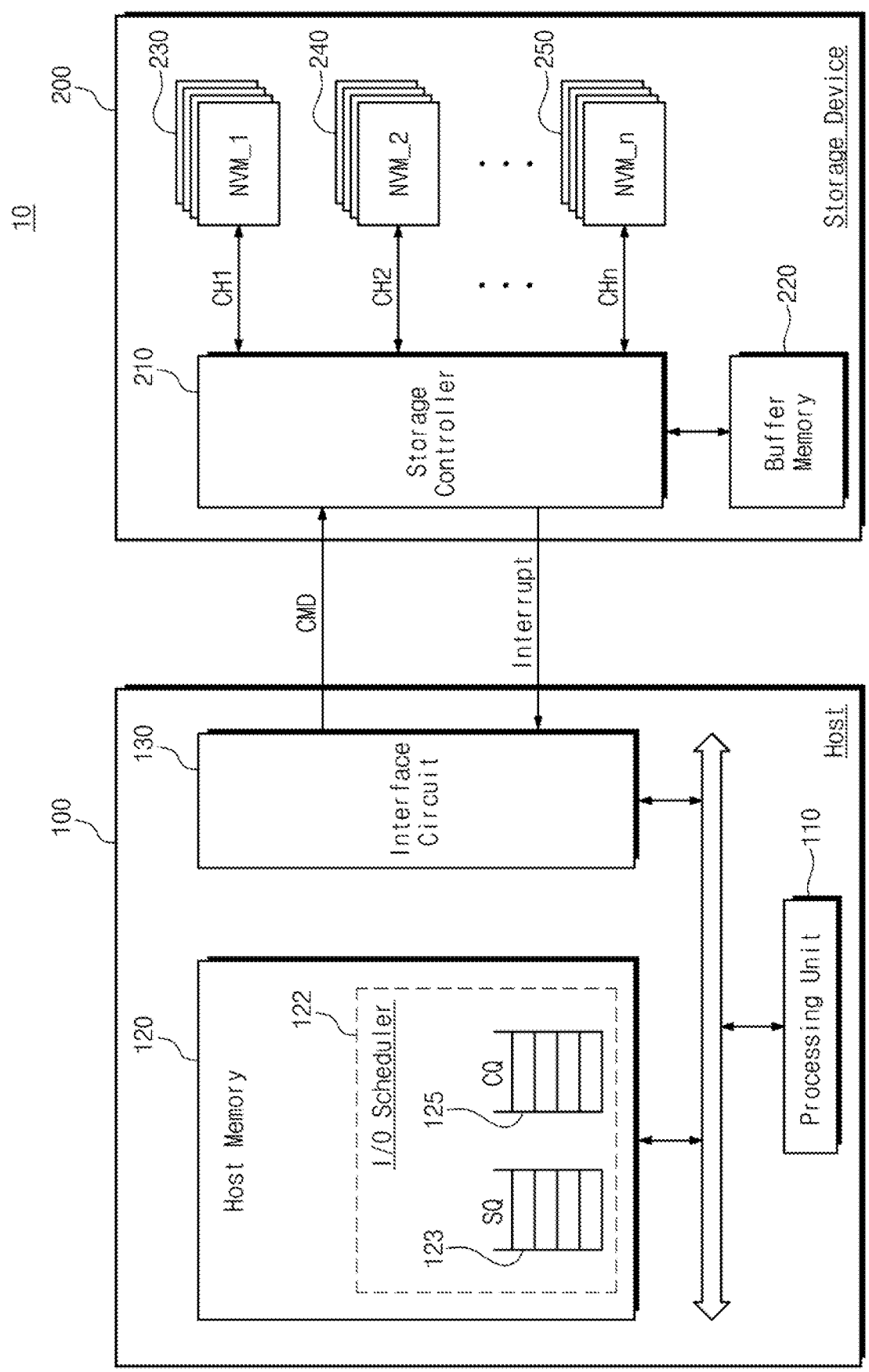
FIG. 1 is a block diagram illustrating a user device according to an exemplary embodiment of the inventive concept.

Exemplary embodiments of the present inventive concept will be described more fully hereinafter with reference to the accompanying drawings. In the drawings, the size and relative sizes of layers and regions may be exaggerated for clarity. Like reference numerals may refer to like elements throughout the accompanying drawings.

Below, a solid state drive (SSD) using a flash memory device will be exemplified to describe features and functions of exemplary embodiments of the inventive concept. However, exemplary embodiments of the inventive concept are not limited thereto.

It will be understood that the terms "first," "second," "third," etc. are used herein to distinguish one element from another, and the elements are not limited by these terms. Thus, a "first" element in an exemplary embodiment may be described as a "second" element in another exemplary embodiment.

FIG. 1 is a block diagram illustrating a user device according to an exemplary embodiment of the inventive concept. Referring to FIG. 1, a user device 10 according to an exemplary embodiment of the inventive concept may include a host 100 and a storage device 200. The host 100 may provide a command CMD to the storage device 200. The storage device 200 may write a completion entry at a completion queue CQ of the host 100 as the result of executing a command, and may issue an interrupt. For example, according to exemplary embodiments of the inventive concept, the storage device 200 may issue less interrupts than the number of events occurring that correspond to completion entries being written. This will be described in further detail below.

The host 100 may read or write data from or to the storage device 200. For example, the host 100 may write data to the storage device 200 and may generate a command CMD used to read data stored in the storage device 200. For example, the host 100 may output a command CMD to the storage device 200 and may receive a completion entry indicating whether a corresponding command is executed, and an associated interrupt, from the storage device 200. The host 100 may execute an interrupt process for completing a thread or a task associated with a corresponding command in response to the interrupt.

According to an exemplary embodiment of the inventive concept, the host 100 may include a processing unit 110, a host memory 120, and an interface circuit 130. A variety of software used to drive the host 100 including, for example, an application program, a file system, a device driver, etc., may be loaded onto and stored in the host memory 120.

The processing unit 110 may execute a variety of software (e.g., an application program, an operating system, a device driver, etc.) stored in the host memory 120. For example, the processing unit 110 may execute an operating system (OS), application programs, etc. The processing unit 110 may be, for example, a homogeneous multi-core processor or a heterogeneous multi-core processor.

An application program or data to be processed by the processing unit 110 may be loaded on the host memory 120. An input/output scheduler 122 for managing a queue for a command to be transferred to the storage device 200 may be loaded on the host memory 120. The input/output scheduler 122 may include, for example, a submission queue 123 and a completion queue 125. The submission queue 123 may be, for example, a queue that corresponds to commands to be sent to the storage device 200. The completion queue 125 may be, for example, a wait string of completion entries written by the storage device 200, and may indicate whether a command requested by the host 100 is completed.

The submission queue 123 may be written or supplied by the host 100 and may be read by the storage device 200. For example, a tail pointer TP of the submission queue 123 may be advanced by the host 100, and a position of a new tail pointer TP may be sent to the storage device 200. In addition, the storage device 200 may advance a head pointer HP of the submission queue by providing a completion entry.

The completion queue 125 may be written by the storage device 200 and may be stored in the host 100. For example, a tail pointer TP of the completion queue 125 may be advanced through a write operation of the storage device 200. The host 100 may advance a head pointer HP of the completion queue 125 in response to an interrupt, and a position of a new head pointer HP may be transferred to the storage device 200. A position of the head pointer HP may be indicated by the host 100 to the storage device 200 by writing it at a doorbell register of the storage device 200.

The interface circuit 130 may provide a physical connection between the host 100 and the storage device 200. The interface circuit 130 may convert, for example, a command, an address, data, etc., which corresponds to various access requests issued from the host 100, to a format that is suitable for interfacing with the storage device 200. The interface circuit 130 may include at least one of protocols such as, for example, Universal Serial Bus (USB), Small Computer System Interface (SCSI), Peripheral Component Interconnect Express (PCI Express), Advanced Technology Attachment (ATA), parallel ATA (PTA), serial ATA (SATA), and serial attached SCSI (SAS). However, the interface circuit 130 is not limited thereto.

The storage device 200 may access a nonvolatile memory device (e.g., nonvolatile memory devices 230, 240 . . . 250) in response to a command CMD from the host 100, and may perform various requested operations. The storage device 200 may generate an interrupt signal with reference to a doorbell register about a completion queue CQ provided from the host 100. In an exemplary embodiment, the storage device 200 may generate an interrupt only at a time when a first mismatch between a tail pointer TP and a head pointer HP of the completion queue CQ occurs. In an exemplary embodiment, the storage device 200 may generate an interrupt vector corresponding to a plurality of completion signals when the number of entries accumulated at the completion queue CQ exceeds a threshold TH. In an exemplary embodiment, the storage device 200 may generate an interrupt vector corresponding to a plurality of completion signals if a certain amount of time elapses from a point in time when a first mismatch between a tail pointer TP and a head pointer HP of the completion queue CQ occurs.

In an exemplary embodiment, the storage device 200 may include, for example, a storage controller 210, a buffer memory 220, and at least one nonvolatile memory device (e.g., nonvolatile memory devices 230, 240 . . . 250).

The storage controller 210 may provide interfacing between the host 100 and the storage device 200. According to exemplary embodiments of the inventive concept, the storage controller 210 may perform interrupt generation with reference to head pointer HP doorbell information of the completion queue CQ from the host 100. For example, in an exemplary embodiment, the storage controller 210 may perform a lazy interrupt generation operation for generating an interrupt at a point in time when a first mismatch between a tail pointer and a head pointer of the completion queue CQ occurs. In an exemplary embodiment, the storage controller 210 may generate a relatively small number of interrupts when the number of completion entries accumulated with the lazy interrupt generation operation exceeds a threshold, or in response to a certain amount of time elapsing from a point in time when an interrupt is previously generated. A detailed operation of the storage controller 210 will be described later.

According to an exemplary embodiment of the inventive concept, the storage device 200 may reduce the number of events that generate an interrupt, thereby reducing consumed resources and improving the performance of the host 100 by reducing overhead.

Figure 2:
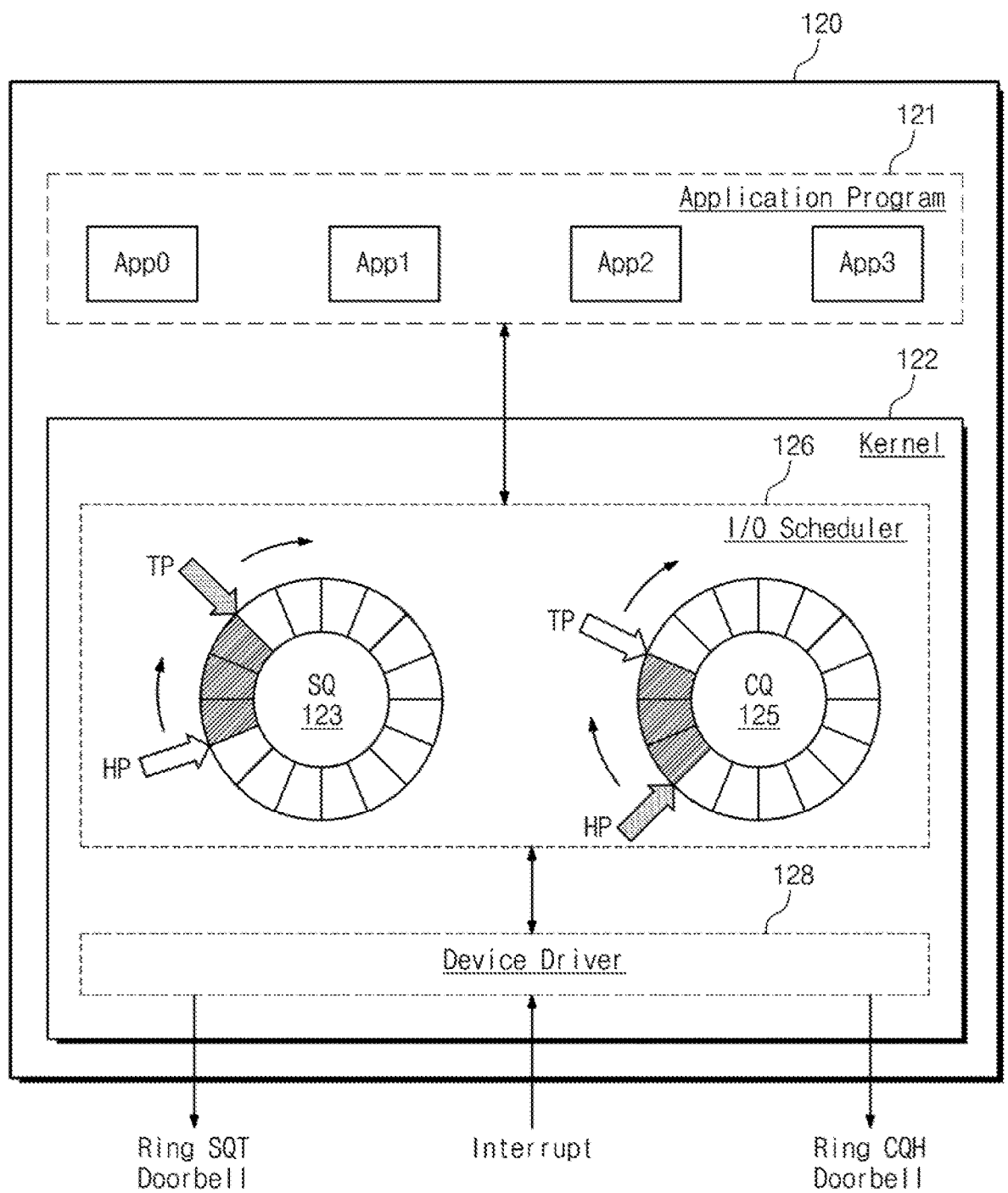
FIG. 2 is a block diagram illustrating a queue management operation of a host according to an exemplary embodiment of the inventive concept.

FIG. 2 is a block diagram illustrating a queue management operation of a host according to an exemplary embodiment of the inventive concept. Referring to FIG. 2, software of the host 100 which is loaded on the host memory 120 and is driven by the processing unit 110 may include, for example, application programs 121 and a kernel 122 of an operating system (OS). The kernel 122 may include, for example, an input/output scheduler 126 and a device driver 128. In addition, a file system may be included in the kernel 122 of the operating system.

The application programs 121 may be driven as a basic service or may be software of an upper layer driven by a user. A plurality of application programs App0 to App3 may be simultaneously driven to provide various services. The application programs App0 to App3 to be executed may be loaded on the host memory 120 and may be executed by the processing unit 110.

For example, if the playback of a video file is requested by a user, an application program (e.g., a video player) for playing a video may be executed. For example, the executed application program may issue a read request or a write request to the storage device to play the requested video file. A command for a write request to the storage device 200 may be written at the submission queue 123, and a tail pointer TP of the submission queue 123 may be updated. In addition, the host 100 may output a tail doorbell to the storage device 200, indicating to the storage device 200 that a new command is recorded at the submission queue 123. In this case, the storage device 200 may fetch a corresponding command from the submission queue 123 and may execute the fetched command.

In addition, the storage device 200 may write a completion entry at the completion queue 125 to indicate that a command most recently fetched from the host 100 is completed. At this time, a tail pointer TP of the completion queue 125 increases as the completion entry is written. Next, if an interrupt corresponding to a corresponding completion entry is received from the storage device 200, the host 100 may perform an internal operation for completing the procedure for processing a command written at the submission queue 123.

The device driver 128 may be, for example, a control module for controlling the storage device 200 at an OS level. If a memory access is requested by a user or from the application programs 121, the device driver 128 may be called. The device driver 128 may be implemented using, for example, a software module of the kernel for controlling the storage device 200.

When a command is generated by an application program, a plurality of commands may be written at the submission queue 123, and a completion entry corresponding to commands written in the submission queue 123 may be written in the completion queue 125. The host 100 may process completion entries written in the completion queue 125 based on interrupts. In a case in which the processing of completion entries accumulated in the completion queue 125 is delayed, an interrupt may frequently occur, which may cause overhead at the host 100. According to exemplary embodiments of the inventive concept, the storage device 200 may generate interrupts in a manner that reduces the number of events for which an interrupt is generated, as described further below, reducing overhead of the system.

Figure 3:
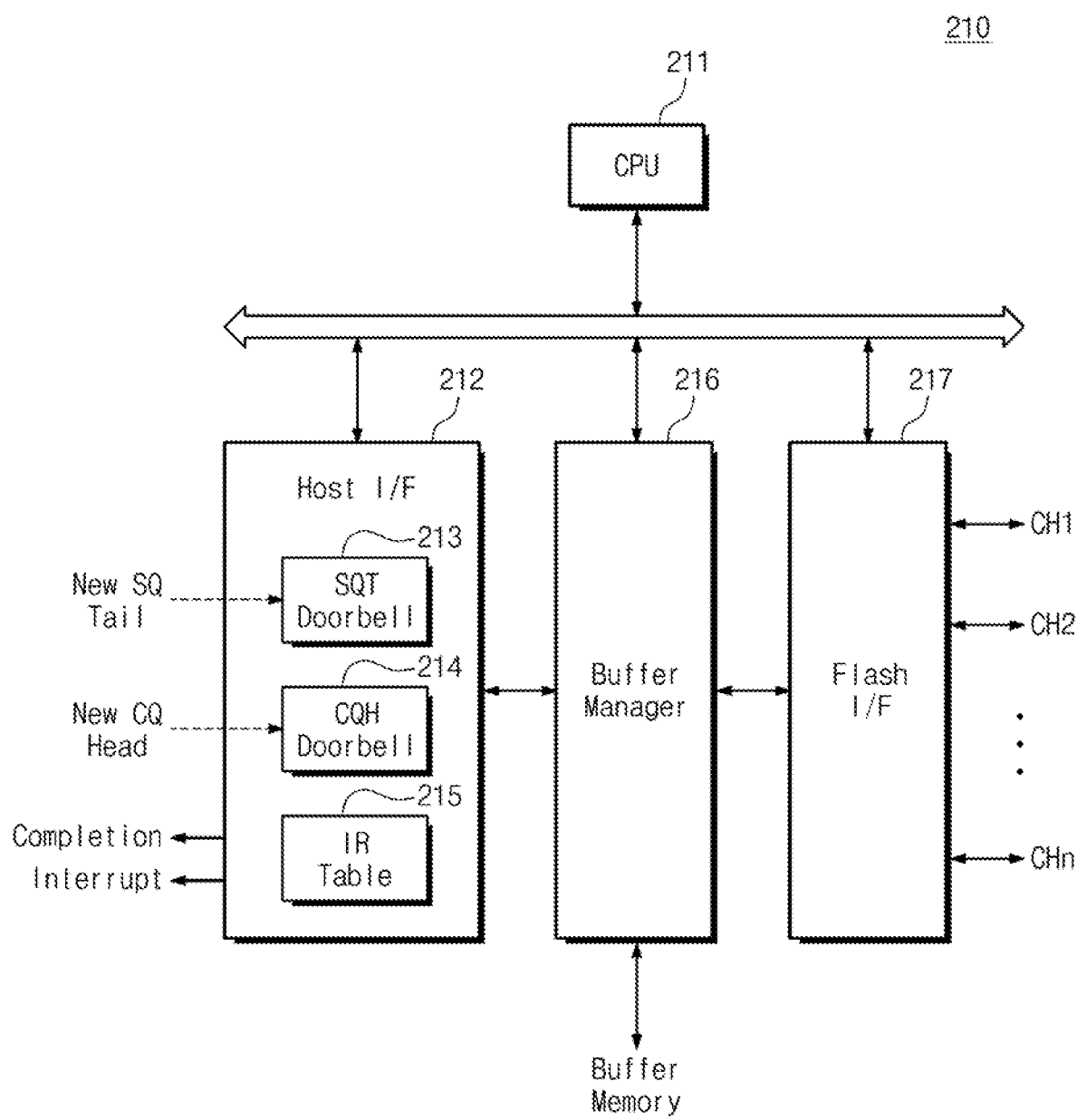
FIG. 3 is a block diagram illustrating a storage controller illustrated in FIG. 1 according to an exemplary embodiment of the inventive concept.

FIG. 3 is a block diagram illustrating the storage controller 210 illustrated in FIG. 1 according to an exemplary embodiment of the inventive concept. Referring to FIG. 3, the storage controller 210 may include, for example, a central processing unit (CPU) 211, a host interface 212, a buffer manager 216, and a flash interface 217.

The CPU 211 may provide a variety of information used to perform a read/write operation regarding the nonvolatile memory device(s) 230, 240 . . . 250 to registers of the host interface 212 and the flash interface 217. The CPU 211 may operate based on firmware which is provided for various control operations of the storage controller 210. For example, the CPU 211 may execute a flash translation layer (FTL) for garbage collection for managing the nonvolatile memory device(s) 230, 240 . . . 250, address managing, wear leveling, etc.

The host interface 212 may communicate with the host 100. For example, the host interface 212 may include a first doorbell register 213 for writing a tail pointer doorbell of the submission queue 123 of the host 100. The host interface 212 may further include a second doorbell register 214 at which the host 100 writes that a head pointer HP of the completion queue 125 is updated and an update position. In addition, the host interface 212 may further include an interrupt table 215 for managing interrupts to be generated according to a status of the second doorbell register 214.

The host interface 212 may provide a physical connection between the host 100 and the storage device 200. For example, the host interface 212 may interface with the storage device 200 in compliance with the bus format of the host 100. The bus format of the host 100 may include at least one of, for example, a universal serial bus (USB), a small computer system interface (SCSI), a PCI express, ATA, a parallel ATA (PTA), a serial ATA (SATA), or a serial attached SCSI (SAS). In an exemplary embodiment, an NVMe protocol installed on the host 100 which exchanges data using a PCI express interface may be applied to the host interface 212.

The buffer manager 216 may control read and write operations of the buffer memory 220. For example, the buffer manager 216 may temporarily store write data or read data in the buffer memory 220. The buffer manager 216 may classify a memory area of the buffer memory by a stream unit under control of the CPU 211.

The flash interface 217 may exchange data with the flash memory device (e.g., nonvolatile memory devices 230, 240 . . . 250). The flash interface 217 may write data from the buffer memory 220 at the flash memory device (e.g., nonvolatile memory devices 230, 240 . . . 250) through memory channels CH1 to CHn. Read data, which is read out from the flash memory device (e.g., nonvolatile memory devices 230, 240 . . . 250), is provided through a memory channel and may be collected by the flash interface 217. The collected data may be stored in the buffer memory 220.

The storage controller 210 may fetch a command written at the submission queue 123 of the host 100 in response to doorbell information written at the first doorbell register 213 by the host 100. If the execution of the fetched command CMD is completed, the storage controller 210 may write a completion entry, indicating that the execution of a corresponding command is completed, at the completion queue 125 of the host 100. In addition, the storage controller 210 may generate an interrupt for a corresponding completion entry with reference to a difference between a tail pointer TP and a head pointer HP of the completion queue 125 managed by the host 100.

According to exemplary embodiments of the inventive concept, even though a completion entry is written at the host 100, the storage controller 210 may generate an interrupt only when a first mismatch value between a tail pointer TP and a head pointer HP of the completion queue 125 occurs. In addition, the storage device 210 may generate an interrupt at a time when the difference between the tail pointer TP and the head pointer HP of the completion queue CQ exceeds a threshold. In addition, the storage device 210 may generate an interrupt for accumulated completion entries after a time elapses from a point in time when a first mismatch between the tail pointer TP and the head pointer HP of the completion queue 125 occurs.

Figure 4:
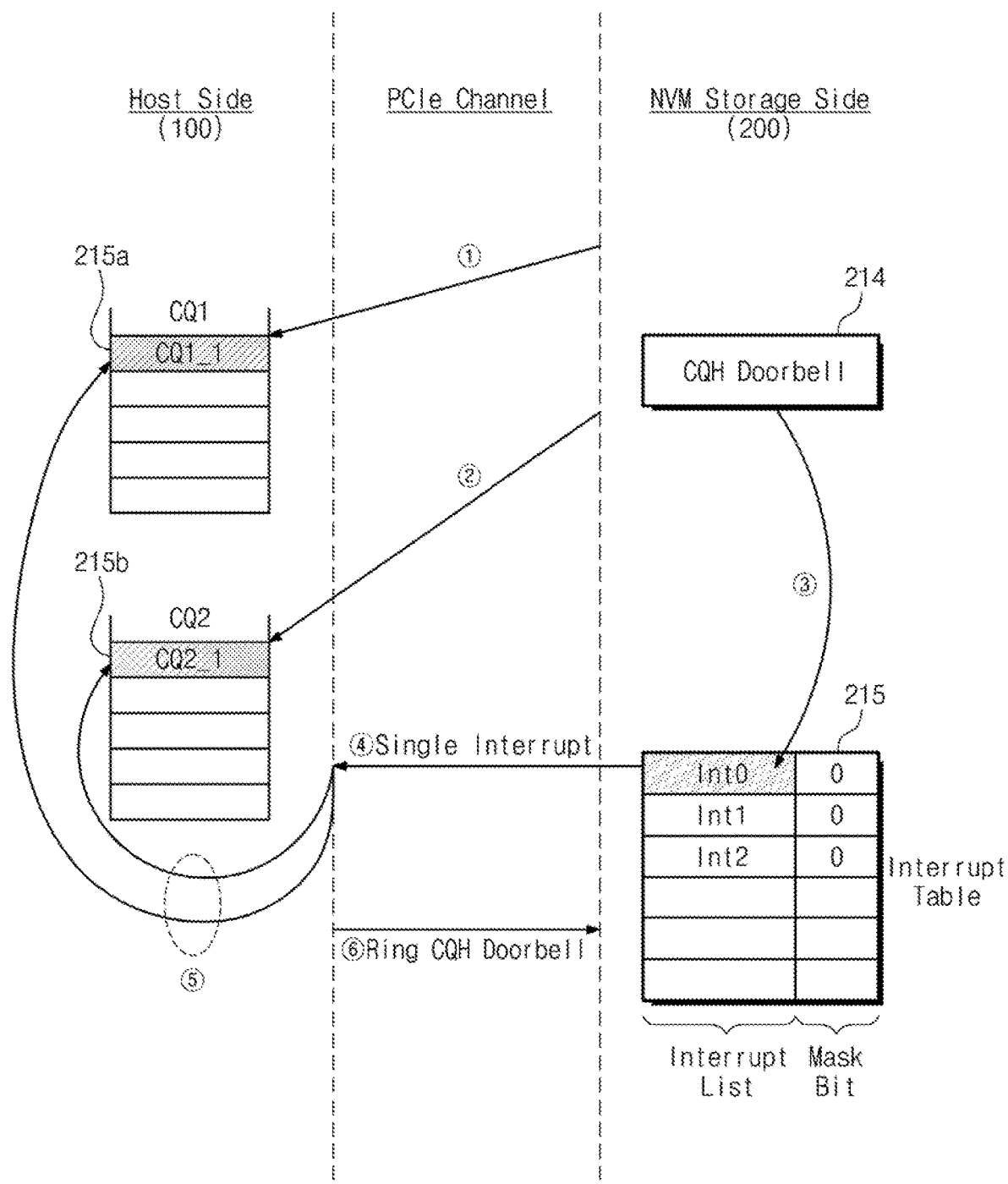
FIG. 4 is a diagram illustrating an example of a method in which the storage controller of FIG. 3 generates an interrupt for a host, according to an exemplary embodiment of the inventive concept.

FIG. 4 is a diagram illustrating an example of a method in which the storage controller 210 of FIG. 3 generates an interrupt for a host, according to an exemplary embodiment of the inventive concept. A method for generating an interrupt corresponding to a plurality of completion queues 215a and 215b managed at the host 100 is illustrated in FIG. 4. In the example described herein, it is assumed that the host 100 previously writes a command set at the submission queue (SQ) 123. Features of the inventive concept described in the current example will be described at a step at which the storage device 200 fetches and executes a command entry and writes a completion entry at the completion queues 215a and 215b of the host 100.

After executing one fetched command, the storage controller 210 may write a completion entry CQ1_1 at a first completion queue 215a (①). After executing another fetched command, the storage controller 210 may write a completion entry CQ2_1 at a second completion queue 215b (②). Next, the storage controller 210 may detect a difference between a head pointer and a tail pointer of a completion queue updated at the second doorbell register 214. If the difference of the head pointer HP and the tail pointer TP of the completion queue corresponds to a first mismatch, or if the number of accumulated completion entries exceeds a threshold, the storage controller 210 may generate an interrupt Int0 corresponding to the two completion entries CQ1_1 and CQ2_1 (④). Accordingly, a single interrupt may allow the host 100 to process two completion entries CQ1_1 and CQ2_1 (⑤). If the processing of the two completion entries CQ1_1 and CQ2_1 is completed, the host 100 may update the second doorbell register 214 to inform, update, or release the head pointers for the completion queues 215a and 215b (⑥).

In the exemplary embodiment of the inventive concept described above, an interrupt regarding a plurality of completion queues is provided using one interrupt vector. However, exemplary embodiments are not limited thereto. For example, exemplary embodiments may utilize three or more completion queues.

Figure 5:
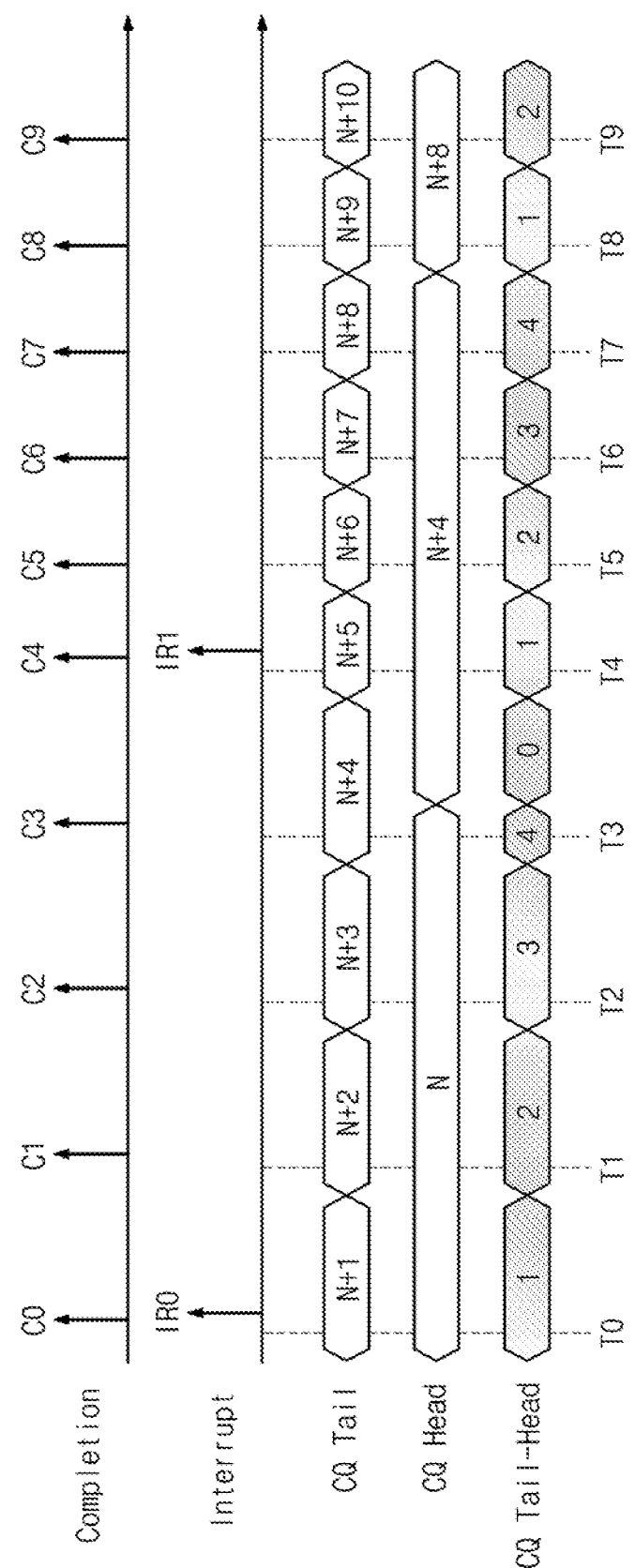
FIG. 5 is a timing diagram illustrating an operating method of a storage device according to an exemplary embodiment of the inventive concept.

FIG. 5 is a timing diagram illustrating an operating method of the storage device 200 according to an exemplary embodiment of the inventive concept. Referring to FIG. 5, in an exemplary scenario, after executing a command fetched from the host 100, the storage controller 210 writes a completion entry at the completion queue 125 of the host 100. An interrupt is generated at a point in time of a first mismatch between a tail pointer and a head pointer of a completion queue. This exemplary scenario will be described in more detail below.

Referring to the exemplary scenario described with reference to FIG. 5, when completing the execution of the command fetched from the host 100, the storage controller 210 writes a completion entry C0 at the completion queue 125 of the host 100. When the completion entry C0 is written, the tail pointer TP of the completion queue 125 increases to (N+1). However, the completion queue 125 is not processed by the host 100, and a head pointer HP of the completion queue 125 does not increase. For this reason, the head pointer HP is N at this time. That is, since the difference between the tail pointer TP and the head pointer HP of the completion queue 125 is 1, a point in time T0 is determined to be a first mismatch point in time (e.g., a first point in time at which the value of the tail pointer TP and the value of the head pointer HP do not match). The difference in values between the tail pointer TP and the head pointer HP that occurs at the first mismatch point in time may be referred to herein as a first mismatch value. In this case, the storage controller 210 outputs an interrupt IR0 to the host 100. The interrupt may be, for example, a pin-base signal or may be transferred in a message signaled interrupt (MSI) manner or an MSI-X manner.

When the execution of one fetched command is completed at time T1, the storage controller 210 writes a completion entry C1 at the completion queue 125 of the host 100. When the completion entry C1 is written, the tail pointer TP of the completion queue 125 increases to (N+2). However, the completion queue 125 is not processed by the host 100, and the head pointer HP of the completion queue 125 does not increase. For this reason, the head pointer HP is still N at this time. Accordingly, when a new completion entry C1 is written at time T1, the difference between the tail pointer TP and the head pointer HP of the completion queue 125 is 2. An interrupt is not generated because the difference between the tail pointer TP and the head pointer HP is not equal to the first mismatch value (e.g., is not equal to 1), and in this exemplary embodiment, interrupts are generated only when the difference between the tail pointer TP and the head pointer HP is equal to the first mismatch value (e.g., equal to 1 in this exemplary scenario).

When the execution of one fetched command is completed at time T2, the storage controller 210 writes a completion entry C2 at the completion queue 125 of the host 100. When the completion entry C2 is written, the tail pointer TP of the completion queue 125 increases to (N+3). However, the completion queue 125 is not processed by the host 100, and the head pointer HP of the completion queue 125 does not increase. Accordingly, when the new completion entry C2 is written at time T2, the difference between the tail pointer TP and the head pointer HP of the completion queue 125 is 3. An interrupt is not generated because the difference between the tail pointer TP and the head pointer HP is not equal to the first mismatch value (e.g., is not equal to 1).

When the execution of one fetched command is completed at time T3, the storage controller 210 writes a completion entry C3 at the completion queue 125 of the host 100. When the completion entry C3 is written, the tail pointer TP of the completion queue 125 increases to (N+4). However, since the completion queue 125 is not yet processed by the host 100, the head pointer HP of the completion queue 125 is maintained at N, and the difference between the tail pointer TP and the head pointer HP is 4. An interrupt is not generated because the difference between the tail pointer TP and the head pointer HP is not equal to the mismatch value (e.g., is not equal to 1). After time T3, the tail pointer TP of the completion queue 125 increases to (N+5), and the completion queue 125 is processed by the host 100. Accordingly, the head pointer HP increases to N+4, and the difference between the tail pointer TP and the head pointer HP is reset to 0 before time T4.

When the execution of one fetched command is completed at time T4, the storage controller 210 writes a completion entry C4 at the completion queue 125 of the host 100. When the completion entry C4 is written, the tail pointer TP of the completion queue 125 increases to (N+5). At this point in time, the head pointer HP of the completion queue 125 is maintained at (N+4). Accordingly, when the new completion entry C4 is written at time T4, the difference between the tail pointer TP and the head pointer HP of the completion queue 125 is equal to the first mismatch value (e.g., is equal to 1). In this case, since the difference between the tail pointer TP and the head pointer HP corresponds to the first mismatch value, the storage controller 210 issues an interrupt IR1.

After time T5, the generation of the interrupt may be controlled under the same condition. Thus, based on the above description, an interrupt is generated only when the difference between the tail pointer TP and the head pointer HP corresponds to the first mismatch value, thereby reducing a decrease in the performance of the host 100 due to interrupt generation.

Figure 6:
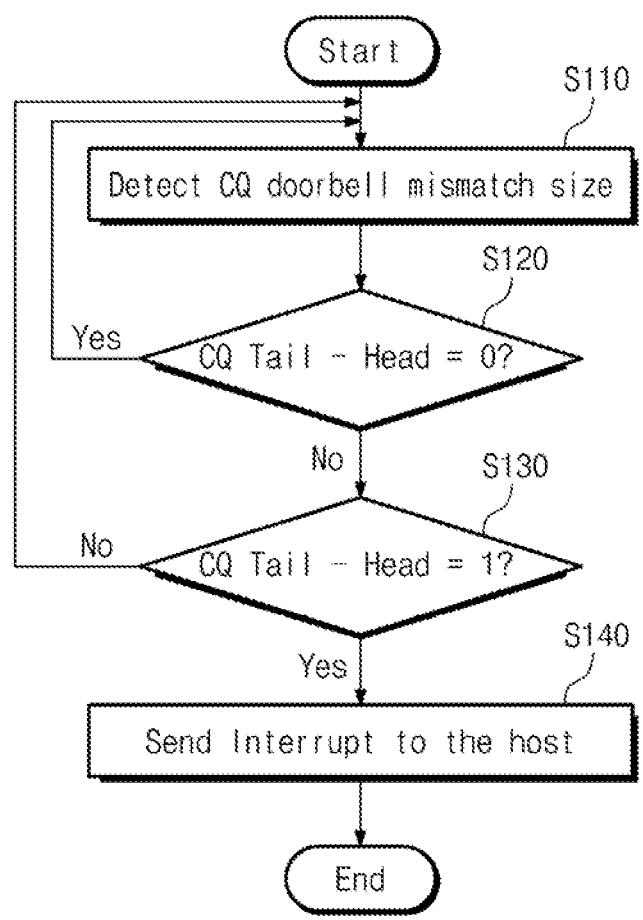
FIG. 6 is a flow chart illustrating an operating method of a storage controller according to an exemplary embodiment of the inventive concept.

FIG. 6 is a flow chart illustrating an operating method of the storage controller 210 according to an exemplary embodiment of the inventive concept. As described above, in an exemplary embodiment, the storage device 210 generates an interrupt only at time at which the difference between the tail pointer TP and the head pointer HP of the completion queue CQ is equal to a first mismatch value.

In operation S110, the storage controller 210 detects the difference (TP−HP) between the tail pointer TP and the head pointer HP with reference to a head pointer doorbell of a completion queue transferred from the host 100. The tail pointer may be previously written by the storage controller 210 at the host 100. Accordingly, a position of the tail pointer TP may be information which the storage controller 210 has recognized. In contrast, the storage controller 210, which writes the completion queue 125, may only depend on doorbell information provided by the host 100 to obtain a position of the head pointer HP of the completion queue 125. The storage controller 210 may detect the difference between the tail pointer TP and the head pointer HP with reference to a position of the head pointer HP provided by the host 100 which consumes the completion queue 125.

In operation S120, the storage device 210 detects whether the difference between the tail pointer TP and the head pointer HP of the completion queue 125 is 0. If the difference between the tail pointer TP and the head pointer HP of the completion queue 125 is 0, the storage controller 210 does not generate an interrupt, and the procedure returns to operation S110. If the difference between the tail pointer TP and the head pointer HP of the completion queue 125 is not 0, the procedure proceeds to operation S130.

In operation S130, the storage device 210 detects whether the difference between the tail pointer TP and the head pointer HP of the completion queue 125 is 1. If the difference between the tail pointer TP and the head pointer HP of the completion queue 125 is not 1, the storage controller 210 does not generate an interrupt and the procedure returns to operation S110. If the difference between the tail pointer TP and the head pointer HP of the completion queue 125 is 1, the procedure proceeds to operation S140. Here, that a difference between the tail pointer TP and the head pointer HP of the completion queue 125 is not 1 may mean that the number of completion queues not processed is 2 or more.

At operation S140, because the difference between the tail pointer TP and the head pointer HP of the completion queue 125 is 1, the storage device 210 outputs an interrupt to the host 100. The interrupt may be, for example, a pin-base signal or may be transferred in a message signaled interrupt (MSI) manner or an MSI-X manner.

In the exemplary embodiment of the inventive concept described above, an interrupt is issued to the host 100 only when the difference between the tail pointer TP and the head pointer HP of the completion queue 125 is 1 (e.g., an interrupt is generated only when the difference between the tail pointer TP and the head pointer HP is equal to the first mismatch value). However, exemplary embodiments of the inventive concept are not limited to the mismatch value being equal to 1. For example, in exemplary embodiments, an interrupt may be generated only when the difference between the tail pointer TP and the head pointer HP of the completion queue 125 is equal to a different mismatch value (e.g., 2, 3, etc.), or an interrupt may be generated only at when an aggregation count is equal to an aggregation threshold, as described further below. The above-described interrupt generation method according to exemplary embodiments may reduce overhead of the host 100 due to the processing of accumulated interrupts (e.g., less interrupts may be utilized).

Figure 7:
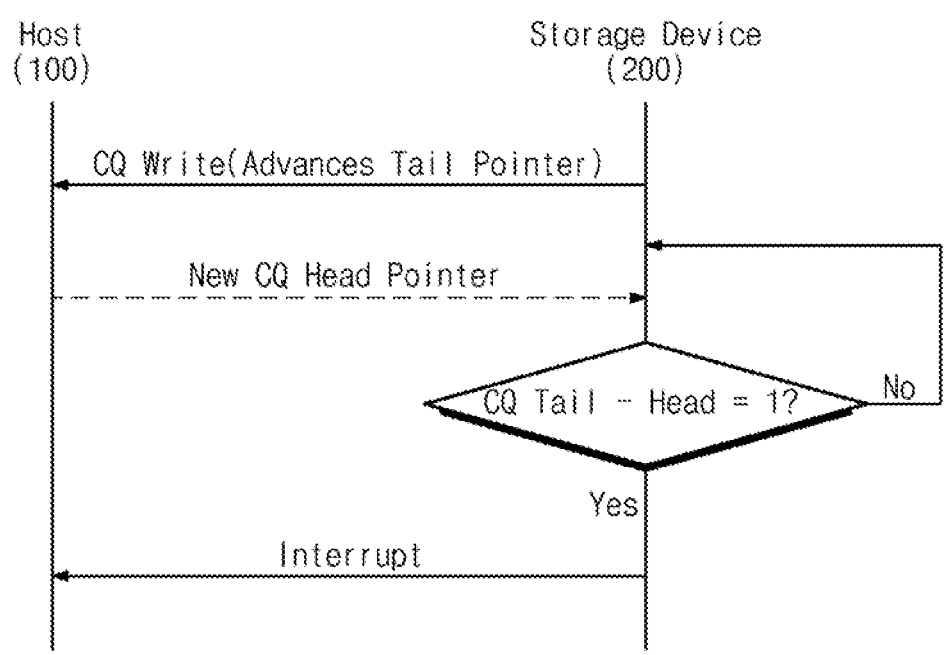
FIG. 7 is a diagram illustrating a call process procedure of a host and a storage device according to an interrupt generation method of FIG. 5, according to an exemplary embodiment of the inventive concept.

FIG. 7 is a diagram illustrating a call process procedure of a host and a storage device according to the interrupt generation method of FIG. 5. Referring to FIG. 7, the procedure begins as the storage device 200 writes a completion entry at the completion queue 125 after processing a command fetched from the host 100.

First, the storage device 200 completes the execution of a fetched command and indicates this state by writing a completion entry at the completion queue 125 of the host 100. At this time, a tail pointer TP of the completion queue 125, which is implemented with a ring buffer of the host 100, increases.

As the completion queue 125 is written, the host 100 informs the storage device 100 of the most recent head pointer HP of the completion queue 125. In an exemplary embodiment, the procedure for providing the most recent head pointer HP of the completion queue 125 may be omitted. Alternatively, in an exemplary embodiment, the most recent head pointer HP of the completion queue 125 is provided before a completion entry is written by the storage device 200.

The storage device 200 detects the difference between the tail pointer TP and the head pointer HP of the completion queue 125 with reference to information of the tail pointer TP and the head pointer HP, and an interrupt is generated only when the difference between the tail pointer TP and the head pointer HP is 1 (e.g., is equal to the first mismatch value in the exemplary scenario of FIG. 5).

Figure 8:
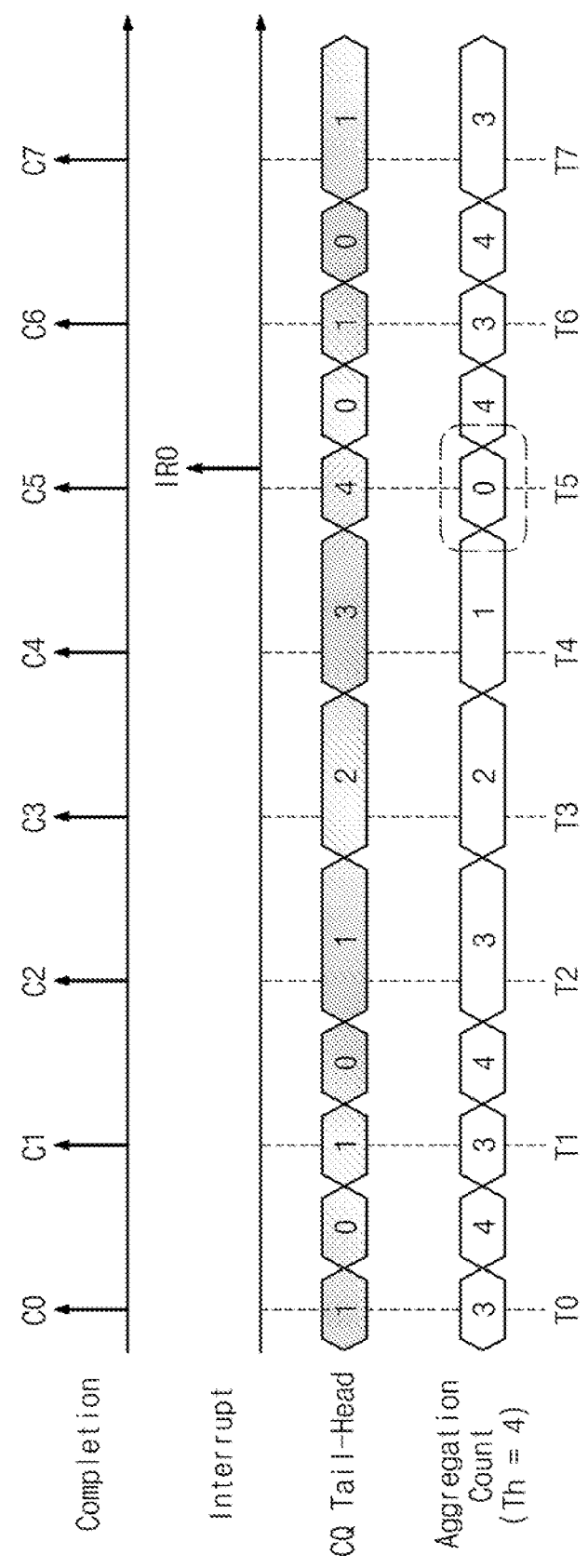
FIG. 8 is a timing diagram illustrating an operating method of a storage device according to an exemplary embodiment of the inventive concept.

FIG. 8 is a timing diagram illustrating an operating method of the storage device 200 according to an exemplary embodiment of the inventive concept. Referring to FIG. 8, in an exemplary scenario, after executing a command fetched from the host 100, the storage controller 210 writes completion entries C0, C1, C2, etc. at the completion queue 125 of the host 100. In the exemplary embodiment described with reference to FIG. 8, an interrupt is generated only when the accumulated difference between the tail pointer TP and the head pointer HP of the completion queue 125 reaches an aggregation threshold. That is, in this exemplary embodiment, an aggregation threshold is set, and interrupts are generated only when the difference between the tail pointer TP and the head pointer HP of the completion queue 125 is equal to the aggregation threshold. In this exemplary embodiment, an interval at which a completion entry is written may vary according to a status or performance of the storage device 200, the type of a fetched command, etc., as described in further detail below.

Referring to the exemplary scenario described with reference to FIG. 8, it is assumed that the aggregation threshold is set to 4 (TH=4). In addition, FIG. 8 shows an aggregation count, which is described below as being equal to (TH−(TP−HP)) with reference to FIG. 9. When completing the execution of the command fetched from the host 100, the storage controller 210 writes a completion entry C0 at the completion queue 125 of the host 100. When the completion entry C0 is written, the tail pointer TP of the completion queue 125 increases. Since it is detected that the difference between the tail pointer TP and the head pointer HP of the completion queue 125 is 1 at time T0, the point in time T0 is determined to be a first mismatch point in time. However, in this exemplary embodiment, the storage controller 210 waits without generating an interrupt at that time. For example, in this exemplary embodiment, the storage controller 210 is set such that an interrupt is generated only at a point in time when the difference between the tail pointer TP and the head pointer HP of the completion queue 125 is equal to the aggregation threshold value (e.g., equal to 4). This point in time also correspond to the aggregation count being equal to 0. Afterwards, since a head pointer doorbell of the completion queue 125 from the host 100 is written, the difference between the tail pointer TP and the head pointer HP is set to 1, and thus, the aggregation count is 4.

When the execution of one fetched command is completed at time T1, the storage controller 210 writes a completion entry C1 at the completion queue 125 of the host 100. When the completion entry C1 is written, the tail pointer TP of the completion queue 125 increases. Since it is detected that the difference between the tail pointer TP and the head pointer HP of the completion queue 125 is 1 at time T1, the point in time T1 is determined to be equal to the first mismatch value (e.g., equal to 1). However, in this exemplary embodiment, the storage controller 210 waits without generating an interrupt even at that time. For example, in this exemplary embodiment, the storage controller 210 is set such that an interrupt is generated only at a point in time when the difference between the tail pointer TP and the head pointer HP of the completion queue 125 is equal to the aggregation threshold value (e.g., is equal to 4). This point in time also corresponds to the aggregation count being equal to 0. Afterwards, since a head pointer doorbell of the completion queue 125 from the host 100 is written, the difference between the tail pointer TP and the head pointer HP is set to 0, and thus, the aggregation count is 4.

When the execution of one fetched command is completed at time T2, the storage controller 210 writes a completion entry C2 at the completion queue 125 of the host 100. When the completion entry C2 is written, the tail pointer TP of the completion queue 125 increases. At time T2, it is detected that the difference between the tail pointer TP and the head pointer HP of the completion queue 125 is 1, and an aggregation count of 3 is detected. However, in an exemplary embodiment, the storage controller 210 waits without generating an interrupt even at that time.

When the execution of one fetched command is completed, at time T3, the storage controller 210 writes a completion entry C3 at the completion queue 125 of the host 100. When the completion entry C3 is written, it is detected that the difference between the tail pointer TP and the head pointer HP of the completion queue 125 is 2, and an aggregation count of 2 is detected. Accordingly, the storage controller 210 waits without generating an interrupt even at that time.

When the execution of one fetched command is completed, at time T4, the storage controller 210 writes a completion entry C4 at the completion queue 125 of the host 100. When the completion entry C4 is written, it is detected that the difference between the tail pointer TP and the head pointer HP of the completion queue 125 is 3, and an aggregation count of 1 is detected. Accordingly, the storage controller 210 waits without generating an interrupt even at that time.

When the execution of one fetched command is completed, at time T5, the storage controller 210 writes a completion entry C5 at the completion queue 125 of the host 100. When the completion entry C5 is written, it is detected that the difference between the tail pointer TP and the head pointer HP of the completion queue 125 is equal to 4 (e.g., is equal to the aggregation threshold), and an aggregation count of 0 is detected. Since the difference between the tail pointer TP and the head pointer HP is equal to the aggregation threshold, and since the aggregation count regarding the tail pointer TP and the head pointer HP reaches 0, the storage controller 210 generates an interrupt IR0 corresponding to a plurality of completion entries accumulated at the host 100.

In the exemplary embodiment described above, the storage device 210 generates an interrupt only when the difference between a tail pointer TP and a head pointer HP of the completion queue CQ reaches an aggregation threshold. That is, an interrupt is generated only at a specific aggregation count (e.g., an aggregation count equal to 0). Accordingly, in exemplary embodiments of the inventive concept, a decrease in the performance of the host due to interrupt aggregation may be reduced.

Figure 9:
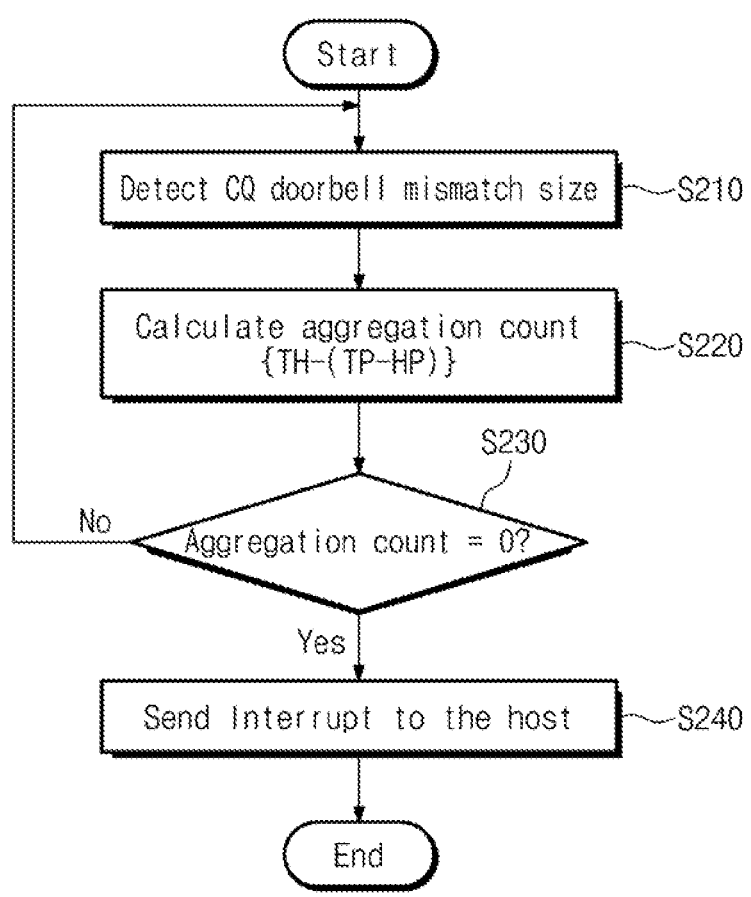
FIG. 9 is a flow chart illustrating an interrupt generation method of the storage controller according to the exemplary embodiment described with reference to FIG. 8.

FIG. 9 is a flow chart illustrating an interrupt generation method of the storage controller 210 according to the exemplary embodiment of the inventive concept described with reference to FIG. 8. Referring to FIG. 9, the storage controller 210 issues an interrupt based on the number completion entries accumulated at the completion queue 125.

In operation S210, the storage controller 210 detects the difference (TP–HP) between the tail pointer TP and the head pointer HP with reference to a head pointer doorbell of a completion queue 125 transferred from the host 100. The storage controller 210 may calculate the difference (TP–HP) between the tail pointer TP and the head pointer HP of the completion queue 125 with reference to doorbell information which the host 100 provides.

In operation S220, the storage controller 210 determines the number of entries accumulated at the completion queue 125. For example, the storage controller 210 may determine whether the difference between the tail pointer TP and the head pointer HP reaches an aggregation threshold. Here, an aggregation count may be utilized as a parameter for determining whether the number of accumulated entries reaches an aggregation count. That is, the aggregation count is a parameter indicating whether the number of entries accumulated at the completion queue 125 reaches an aggregation count. For example, the aggregation count may correspond to a value obtained by subtracting a difference (TP–HP) between the tail pointer TP and the head pointer HP from the threshold TH. That is, the aggregation count may be calculated by (TH–(TP–HP)). However, the manner of determining whether the number of entries accumulated at the completion queue 125 reaches an aggregation count is not limited thereto.

In operation S230, the storage controller 210 determines whether the aggregation count is 0. Determining that the aggregation count is 0 refers to the number of entries accumulated at the completion queue 125 reaching the threshold TH. When the aggregation count is not 0, the procedure returns to operation S210. When the aggregation count is 0, the procedure proceeds to operation S240.

Since the difference between the tail pointer TP and the head pointer HP of the completion queue 125 reaches the threshold TH, in operation S240, the storage device 210 outputs an interrupt to the host 100. At this time, an interrupt vector may be transferred with a value corresponding to a plurality of completion entries. The interrupt may be, for example, a pin-base signal, or may be transferred in a message signaled interrupt (MSI) manner or an MSI-X manner.

According to the exemplary embodiment of the inventive concept described above, whether to generate an interrupt is determined based on whether the difference between the tail pointer TP and the head pointer HP of the completion queue 125 reaches the threshold TH. That is, in the exemplary embodiment described above, an interrupt is generated only when the difference between the tail pointer TP and the head pointer HP of the completion queue 125 reaches the threshold TH. As a result, according to exemplary embodiments of the inventive concept, the number of interrupts generated and provided to the host 100 may be reduced.

Figure 10:
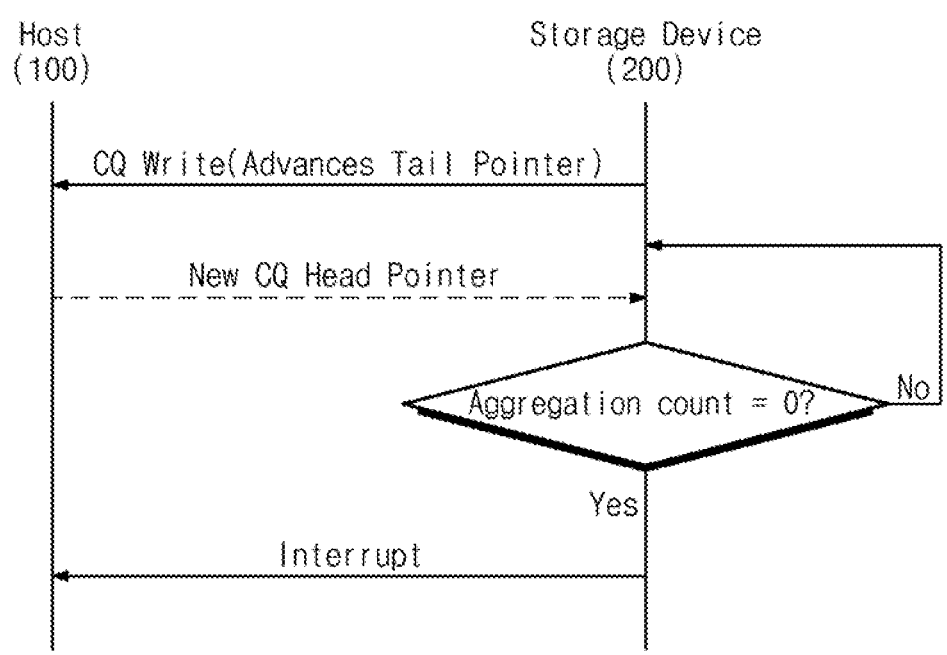
FIG. 10 is a diagram illustrating a call process procedure of a host and a storage device according to an interrupt generation method of FIG. 9, according to an exemplary embodiment of the inventive concept.

FIG. 10 is a diagram illustrating a call process procedure of a host and a storage device according to the interrupt generation method of FIG. 9. Referring to FIG. 10, the procedure begins as the storage device 200 writes a completion entry at the completion queue 125 after processing a command fetched from the host 100.

First, the storage device 200 completes the execution of a fetched command and indicates this state by writing a completion entry at the completion queue 125 of the host 100. At this time, a tail pointer TP of the completion queue 125 increases.

As the completion queue 125 is written, the host 100 informs the storage device 100 of the most recent head pointer HP of the completion queue 125. In an exemplary embodiment, the procedure for providing the most recent head pointer HP of the completion queue 125 may be omitted. Alternatively, in an exemplary embodiment, the most recent head pointer HP of the completion queue 125 is provided before a completion entry is written by the storage device 200.

The storage controller 210 calculates an aggregation count of the completion queue 125 with reference to head pointer information of the completion queue 125, which is provided by the host 100. That is, it may be determined whether the number of entries not released at the completion queue 125 reaches the threshold TH. In an exemplary embodiment, the aggregation count may be used as a parameter for such a determination. For example, the storage controller 210 may determine the aggregation count is 0, which indicates that the number of accumulated completion entries reaches the threshold TH. When the aggregation count is not 0, the storage controller 210 does not generate an interrupt. In contrast, when the aggregation count is 0, the storage controller 210 issues an interrupt vector associated with a plurality of completion entries accumulated.

Figure 11:
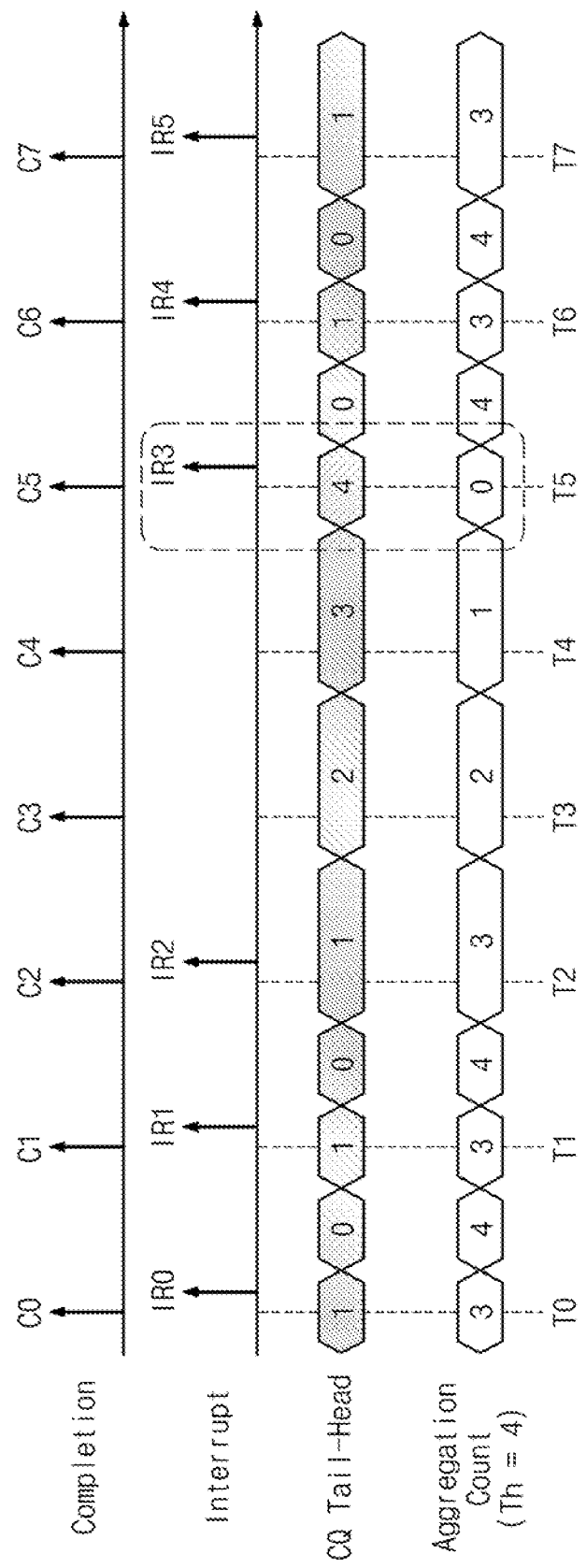
FIG. 11 is a timing diagram illustrating an exemplary embodiment of an interrupt generation method.

FIG. 11 is a timing diagram illustrating an exemplary embodiment of an interrupt generation method. Referring to FIG. 11, in an exemplary embodiment, after executing a command fetched from the host 100, the storage controller 210 writes completion entries C0, C1, C2, etc. at the completion queue 125 of the host 100. In addition, the storage device 210 issues an interrupt when either a first mismatch between a tail pointer TP and a head pointer HP of the completion queue 125 occurs, as described with reference to FIGS. 5 to 8, or at a point in time when the number of completion entries accumulated at the completion queue reaches the threshold TH, as described with reference to FIGS. 8 to 10.

When the execution of the command fetched from the host 100 is completed, at time T0, the storage controller 210 writes a completion entry C0 at the completion queue 125 of the host 100. The storage controller 210 determines whether to issue an interrupt corresponding to a completion entry C0 based on a criteria of exemplary embodiments of the inventive concept, as described above. Since it is detected that the difference between the tail pointer TP and the head pointer HP of the completion queue 125 is 1 at time T0, the point in time T0 is determined to be a first mismatch point in time. In addition, at that time, an aggregation count corresponding to the threshold TH (TH=4 in the exemplary scenario of FIG. 11) is calculated to be 3. The storage controller 210 issues an interrupt IR0 regardless of the size of an aggregation count, since the first mismatch between the tail pointer TP and the head pointer HP occurs.

At times T1 and T2, when completion entries C1 and C2 are respectively written at the completion queue 125 of the host 100, interrupts IR0 and IR1 may be issued according to either an aggregation count condition or a condition corresponding to a first mismatch between pointers.

When the execution of the command fetched from the host 100 is completed, at time T3, the storage controller 210 writes a completion entry C3 at the completion queue 125 of the host 100. The storage controller 210 determines whether to issue an interrupt corresponding to the completion entry C3. For example, whether aggregation counts reach the threshold TH may be respectively determined. Since the difference between the tail pointer TP and the head pointer HP is 2, it is determined that a first mismatch between pointers does not occur. In addition, a value of the aggregation count is calculated to be 2. Accordingly, it is determined that a first mismatch between pointers and an aggregation count condition are not satisfied. For this reason, the storage controller 210 waits without generating an interrupt corresponding to the completion entry C3.

Since the difference between the tail pointer TP and the head pointer HP is 3, at time T4, it is determined that a first mismatch between pointers does not occur. In addition, a value of the aggregation count is calculated to be 1. Accordingly, a first mismatch between pointers and an aggregation count condition are not satisfied. For this reason, at time T4, the storage controller 210 does not generate an interrupt corresponding to the completion entry C4.

When the execution of the command fetched from the host 100 is completed, at time T5, the storage controller 210 writes a completion entry C5 at the completion queue 125 of the host 100. The storage controller 210 determines whether to issue an interrupt corresponding to the completion entry C5. For example, in an exemplary embodiment, the storage controller 210 may respectively determine whether a first mismatch between the tail pointer TP and the head pointer HP occurs, and whether aggregation counts reach the threshold TH. Since the difference between the tail pointer TP and the head pointer HP is 4, it does not correspond to a first mismatch condition. However, a value of the aggregation count is calculated to be 0. Accordingly, the storage controller 210 issues an interrupt IR3 based on the aggregation count condition.

At times T6 and T7, a determination regarding whether to generate interrupts for completion entries C6 and C7 is made according to the above-described manner. For convenience of explanation, a further description thereof is thus omitted.

Figure 12:
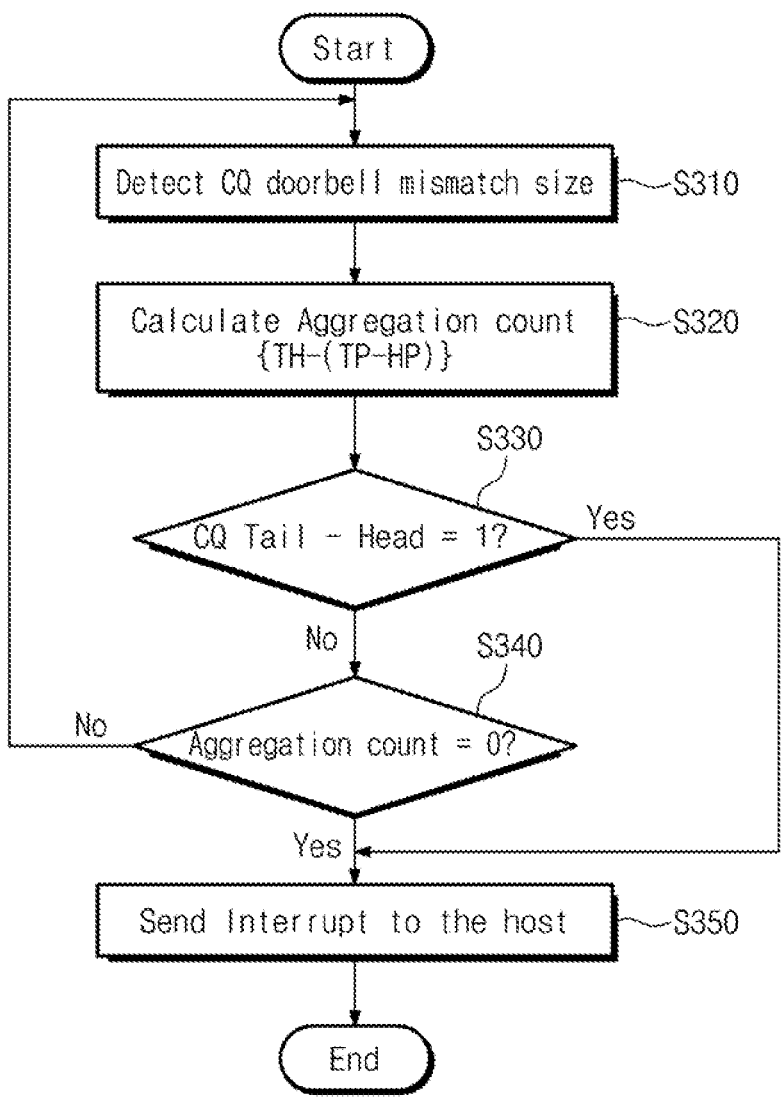
FIG. 12 is a flow chart illustrating an interrupt generation method of the storage controller for performing the exemplary embodiment described with reference to FIG. 11.

FIG. 12 is a flow chart illustrating an interrupt generation method of the storage controller 210 for performing the exemplary embodiment of the inventive concept described with reference to FIG. 11. Referring to FIG. 12, in an exemplary embodiment, the storage controller 210 issues an interrupt based on the number of completion entries accumulated at the completion queue 125 and based on a first mismatch between pointers (e.g., an interrupt is generated when either of these conditions occur).

In operation S310, the storage controller 210 detects a difference (TP–HP) between the tail pointer TP and the head pointer HP with reference to a head pointer doorbell of the completion queue 125 transferred from the host 100. The storage controller 210 calculates the difference (TP–HP) between the tail pointer TP and the head pointer HP of the completion queue 125 with reference to doorbell information, which is provided by the host 100.

In operation S320, the storage controller 210 calculates the number of entries accumulated at the completion queue 125. For example, in an exemplary embodiment, the storage controller 210 may determine whether the difference between the tail pointer TP and the head pointer HP reaches the threshold. In an exemplary embodiment, the storage controller 210 calculates an aggregation count, which is a value obtained by subtracting the difference (TP–HP) between the tail pointer TP and the head pointer HP from the threshold TH.

In operation S330, the storage controller 210 determines whether a first mismatch between pointers of the completion queue 125 occurs (e.g., (TP–HP)=1). When the difference (TP–HP) between pointers is not 1, the procedure proceeds to operation S340. When the difference (TP–HP) between pointers is 1, the procedure proceeds to operation S350 to issue an interrupt.

In operation S340, the storage controller 210 determines whether the aggregation count is 0. It is determined that the aggregation count is 0 when the number of entries accumulated at the completion queue 125 reaches the threshold TH. When the aggregation count is not 0, the procedure returns to operation S310. When the aggregation count is 0, the procedure proceeds to operation S350.

Since the difference between the tail pointer TP and the head pointer HP of the completion queue 125 is 1 for the first time, and since the aggregation count reaches the threshold TH, in operation S350, the storage device 210 issues an interrupt. At this time, an interrupt vector may be transferred with a value corresponding to one completion entry or a plurality of completion entries.

According to the exemplary embodiment of the inventive concept described above, whether to generate an interrupt is determined based on whether a first mismatch between pointers of the completion queue 125 occurs and whether the number of entries accumulated reaches a threshold (e.g., it is determined to generate an interrupt when either of these conditions occur).

Figure 13:
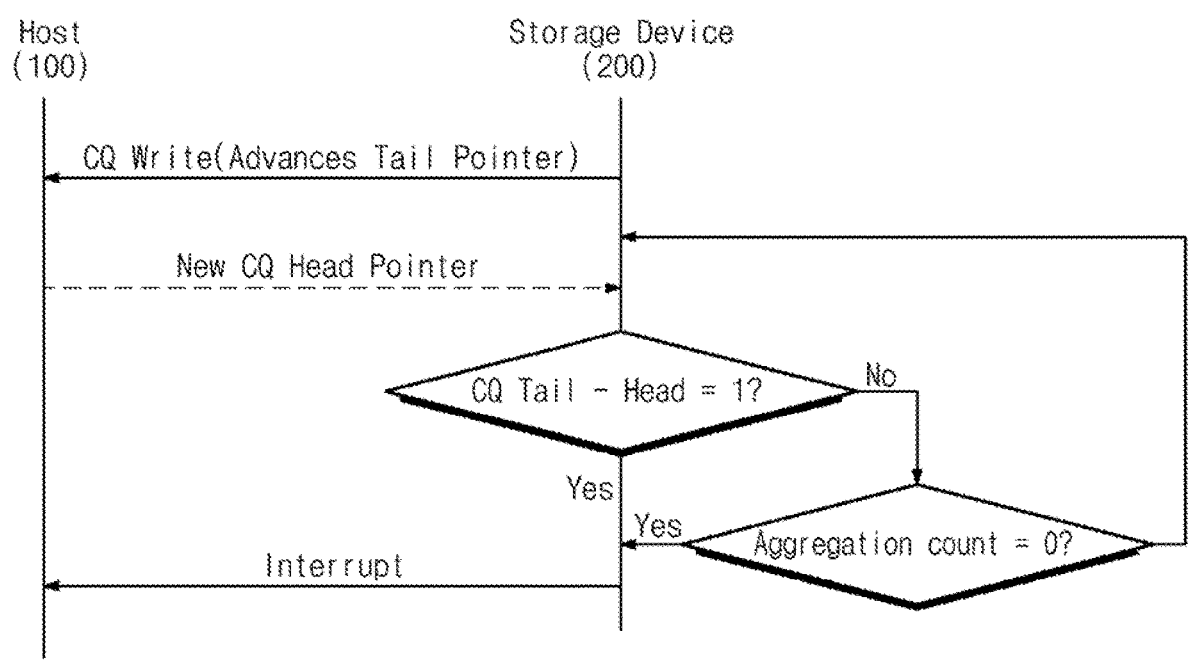
FIG. 13 is a diagram illustrating a call process procedure of a host and a storage device according to an interrupt generation method of FIG. 11, according to an exemplary embodiment of the inventive concept.

FIG. 13 is a diagram illustrating a call process procedure of a host and a storage device according to the interrupt generation method of FIG. 11. Referring to FIG. 13, the procedure begins as the storage device 200 writes a completion entry at the completion queue 125 after processing a command fetched from the host 100.

First, the storage device 200 completes the execution of a fetched command and indicates this state by writing a completion entry at the completion queue 125 of the host 100. At this time, a tail pointer TP of the completion queue 125 of the host 100 increases.

As the completion queue 125 is written, the host 100 informs the storage device 100 of the most recent head pointer HP of the completion queue 125. In an exemplary embodiment, the procedure for providing the most recent head pointer HP of the completion queue 125 may be omitted. Alternatively, in an exemplary embodiment, the most recent head pointer HP of the completion queue 125 is provided before a completion entry is written by the storage device 200.

The storage controller 210 detects a difference (TP–HP) between the tail pointer TP and the head pointer HP of the completion queue 125 with reference to head pointer information of the completion queue 125 transferred from the host 100. In addition, the storage controller 210 calculates an aggregation count, which is a value obtained by subtracting the difference (TP–HP) between the tail pointer TP and the head pointer HP from the threshold TH. When the difference (TP–HP) between pointers is 1, the storage controller 210 issues an interrupt regardless of an aggregation count value. When the difference (TP–HP) between pointers is not 1, it is determined whether the aggregation count reaches the threshold TH. In an exemplary embodiment, when the difference (TP–HP) between pointers is 0, the storage controller 210 issues an interrupt, and when the difference (TP–HP) between pointers is not 0, the storage controller 210 does not issue an interrupt.

Figure 14:
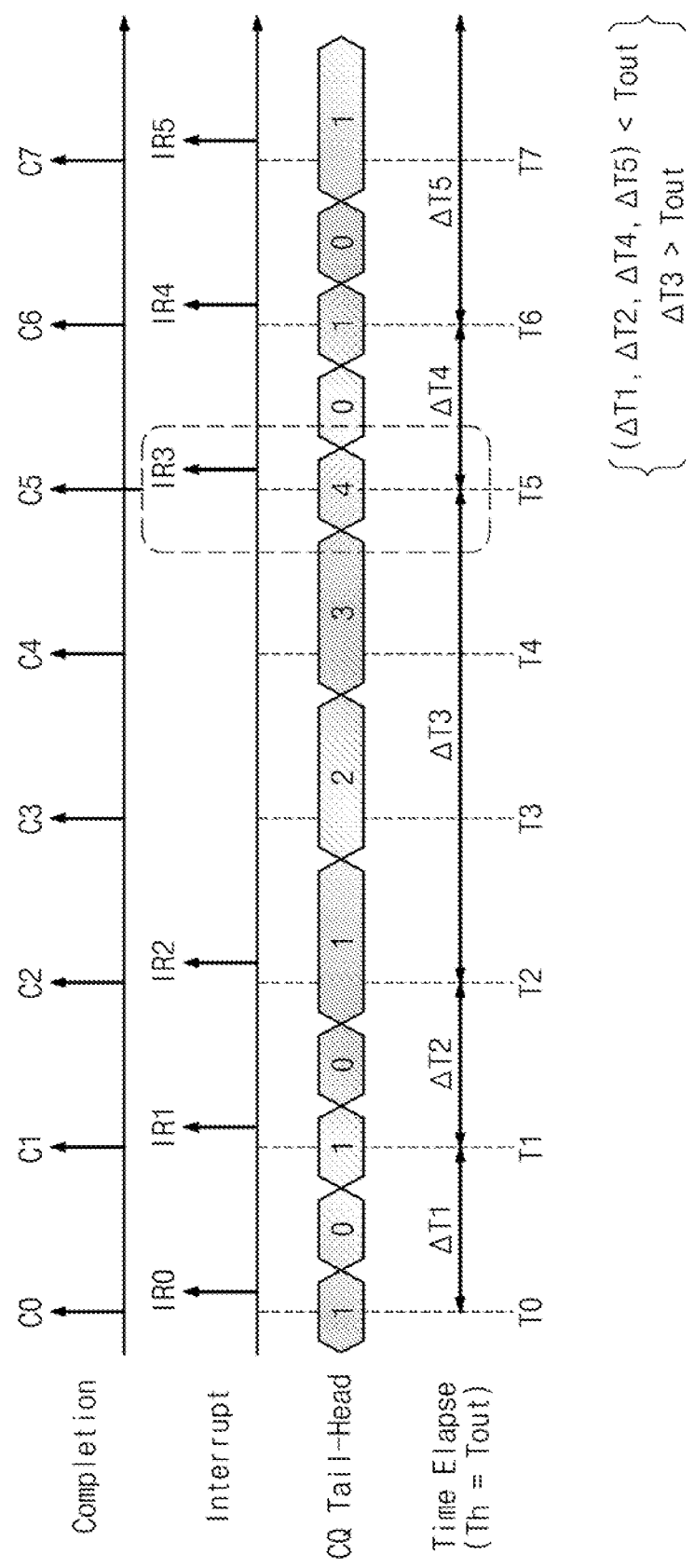
FIG. 14 is a timing diagram illustrating an interrupt generation method according to an exemplary embodiment of the inventive concept.

FIG. 14 is a timing diagram illustrating an interrupt generation method according to an exemplary embodiment of the inventive concept. Referring to FIG. 14, after executing a command fetched from the host 100, the storage controller 210 writes completion entries C0, C1, C2, etc. at the completion queue 125 of the host 100. In addition, the storage device 210 generates an interrupt when a first mismatch between a tail pointer TP and a head pointer HP of the completion queue 125 occurs (see FIGS. 5 to 7), or when a reference elapsed time Tout elapses after the issuing of a previous interrupt. Here, an interval when a completion entry is written may vary according to, for example, a status or performance of the storage device 200, a type of a fetched command, etc. In addition, the reference elapsed time Tout may be determined in light of a status of performance of the host 100 or a status or performance of the storage device 200.

When the execution of the command fetched from the host 100 is completed, at time T0, the storage controller 210 writes a completion entry C0 at the completion queue 125 of the host 100. The storage controller 210 determines whether to issue an interrupt corresponding to the completion entry C0 based on criteria of exemplary embodiments of the inventive concept, as described above. Since it is detected that the difference between the tail pointer TP and the head pointer HP of the completion queue 125 is 1 at time T0, the point in time T0 is determined to be a first mismatch point in time. Accordingly, an interrupt IR0 is issued regardless of an elapsed time.

At time T1, a completion entry C1 is written in the completion queue 125 of the host 100, and the storage controller 210 monitors the completion queue 125 to determine whether a first mismatch between pointers of the completion entry 125 occurs, and it is determined whether the reference elapsed time Tout elapses after issuing the interrupt. Since it is detected that the difference between the tail pointer TP and the head pointer HP of the completion queue 125 is 1, the detection point in time is determined to be a first mismatch point in time (e.g., the difference is equal to the first mismatch value). In addition, a first mismatch point in time is determined to be a point in time when a time $\Delta T1$ elapses after the interrupt IR0 is issued. In this case, since the difference between pointers at time T1 satisfies an interrupt issuing condition, the interrupt IR1 is issued regardless of an elapsed time. Since the same interrupt issuing condition as time T1 is satisfied at time T2, an interrupt IR2 is issued at time T2.

However, as a completion entry C3 is written at time T3, the storage controller 210 monitors the completion queue 125 to determine whether a first mismatch between pointers of the completion entry occurs, and it is determined whether the reference elapsed time Tout elapses. At this time, the difference between the tail pointer TP and the head pointer HP is 2. That is, the difference between pointers does not satisfy an interrupt issuing condition. In addition, since the reference elapsed time Tout does not elapse after the interrupt IR2 is issued, the interrupt issuing condition is not satisfied. Accordingly, the issuing of the interrupt is postponed at that time.

At time T4, the difference between pointers is 3, and the reference elapsed time Tout does not elapse after the interrupt IR2 is issued. Thus, an interrupt issuing condition is not satisfied.

At time T5, the difference between pointers is 4, which does not satisfy the interrupt issuing condition. However, a point in time T5 corresponds to a time $\Delta T3$ (which is longer than Tout) elapsing after the interrupt IR2 is issued. Accordingly, the storage controller 210 issues an interrupt IR3.

At time T6, since an elapsed time $\Delta T4$ satisfies the interrupt issuing condition, and a difference (TP–HP) between points of the completion queue 125 corresponds to 1, an interrupt IR4 is issued. At time T7, since an elapsed time $\Delta T5$ does not satisfy the interrupt issuing condition, but a difference (TP–HP) between points of the completion queue 125 corresponds to 1, an interrupt IR5 is issued.

According to the exemplary embodiment of the inventive concept described above with reference to FIG. 14, a determination of whether to issue an interrupt is made based on the amount of time elapsing after an interrupt is issued, and whether the difference between pointers of the completion queue 125 corresponds to a first mismatch (e.g., an interrupt is generated when either of these interrupt generation conditions are satisfied).

Figure 15:
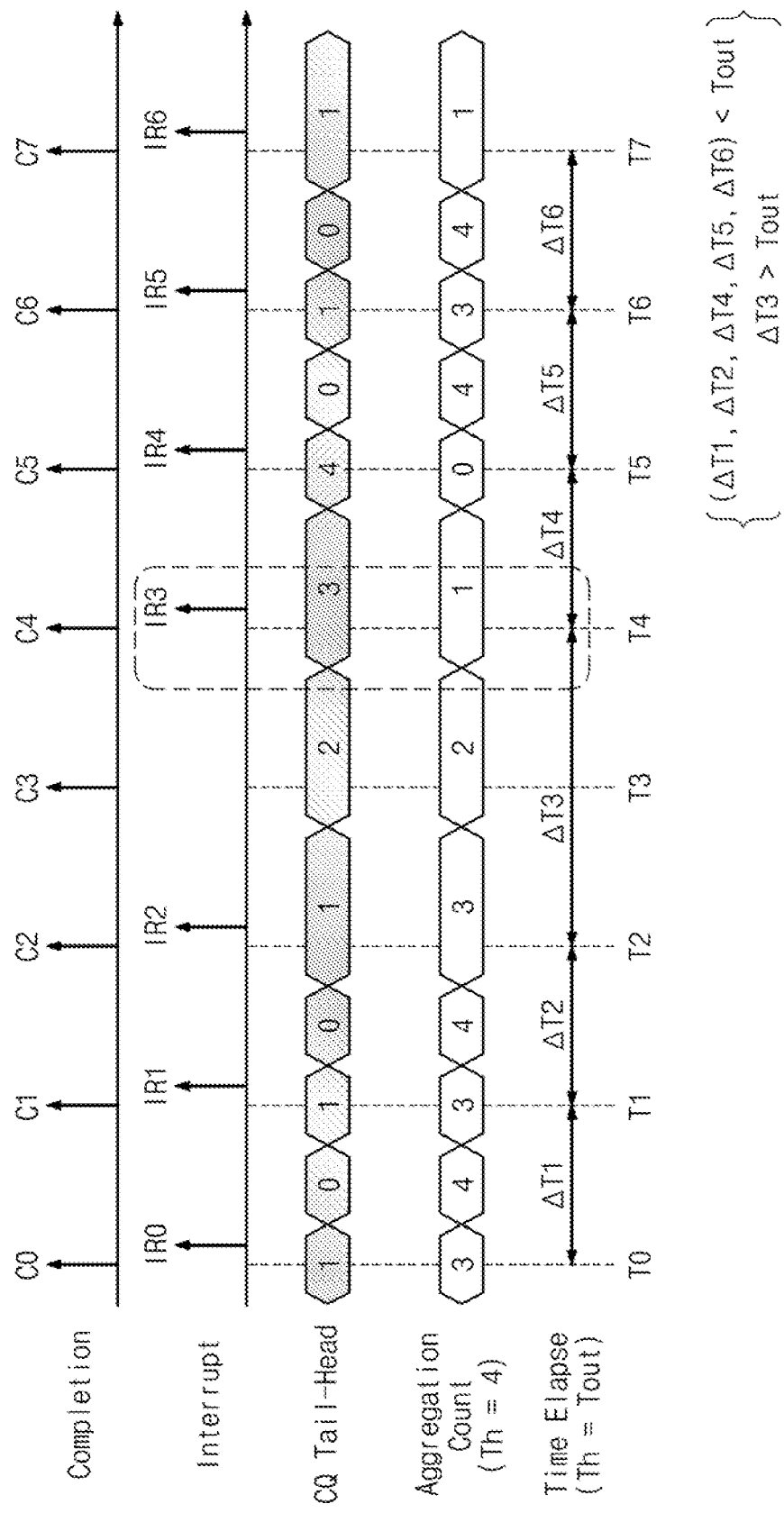
FIG. 15 is a timing diagram illustrating an interrupt generation method according to an exemplary embodiment of the inventive concept.

FIG. 15 is a timing diagram illustrating an interrupt generation method according to an exemplary embodiment of the inventive concept. Referring to FIG. 15, the storage controller 210 issues an interrupt based on at least one of determining whether a first mismatch between pointers of the completion queue 125 occurs (see FIGS. 5 to 7), an aggregation count (see FIGS. 8 to 10), and a time elapsing after the issuing of an interrupt (see FIG. 14). For convenience of description, it is assumed that the time elapsing after the issuing of an interrupt is Tout.

At time T0, the storage controller 210 writes a completion entry C0 at the completion queue 125. The storage controller 210 determines whether to issue an interrupt corresponding to the completion entry C0 based on criteria of exemplary embodiments of the inventive concept described herein. Since it is detected that the difference between the tail pointer TP and the head pointer HP of the completion queue 125 is 1 at time T0, the point in time T0 is determined to be a first mismatch point in time. Accordingly, an interrupt IR0 is issued at that time regardless of an elapsed time or an aggregation count. At times T1 and T2, interrupts IR1 and IR2 are respectively issued for the same reason as at time T0. That is, the point in time T1 is a first mismatch point in time because an elapsed time $\Delta T1$ is shorter than Tout, and a value corresponding to the difference between the tail pointer TP and the head pointer HP transitions from 0 to 1. The point in time T2 is the first mismatch point in time because an elapsed time $\Delta T2$ is shorter than Tout, and a value corresponding to the difference between the tail pointer TP and the head pointer HP transitions from 0 to 1.

However, since the difference between the tail pointer TP and the head pointer HP is 2, it does not correspond to a first mismatch condition. Further, a point in time T3 does not satisfy an elapsed time condition because a time elapsing after the issuing of the interrupt IR2 is shorter than Tout. Further, the point in time T3 does not satisfy an interrupt generation condition because the aggregation count is 2. Accordingly, at time T3, the storage controller 210 does not issue an interrupt.

Since the difference between the tail pointer TP and the head pointer HP is 3, it does not correspond to a first mismatch condition. Further, the point in time T4 does not satisfy an interrupt generation condition because the aggregation count is 1. However, the point in time T4 satisfies the elapsed time condition because a time ΔT3 (which is longer than Tout) elapses after the interrupt IR2 is issued. Accordingly, the storage controller 210 issues an interrupt IR3 at time T4.

At time T5, the aggregation count condition satisfies the interrupt generation condition, and thus, an interrupt IR4 is issued. At time T6, an interrupt IR5 is issued because the difference between pointers satisfies a first mismatch condition. At time T7, an interrupt IR6 is issued because the difference between pointers satisfies the first mismatch condition of the three interrupt generation conditions.

According to the exemplary embodiment of the inventive concept described above, an interrupt is issued based on the following interrupt generation conditions: whether a difference between pointers of the completion queue 125 corresponds to a first mismatch (see FIGS. 5 to 8), an aggregation threshold/aggregation count (see FIGS. 8-10), and a time elapsing after an interrupt is issued (see FIG. 14). In an exemplary embodiment, interrupts are issued in response to at least one of these three interrupt generation conditions occurring. However, exemplary embodiments of the inventive concept are not limited thereto. For example, in exemplary embodiments, additional interrupt generation conditions may be included. In addition, in exemplary embodiments, rather than an interrupt being issued when at least one interrupt condition is satisfied, an interrupt may be issued only when at least two or more certain interrupt conditions are satisfied, or when all possible interrupt conditions are satisfied.

Figure 16:
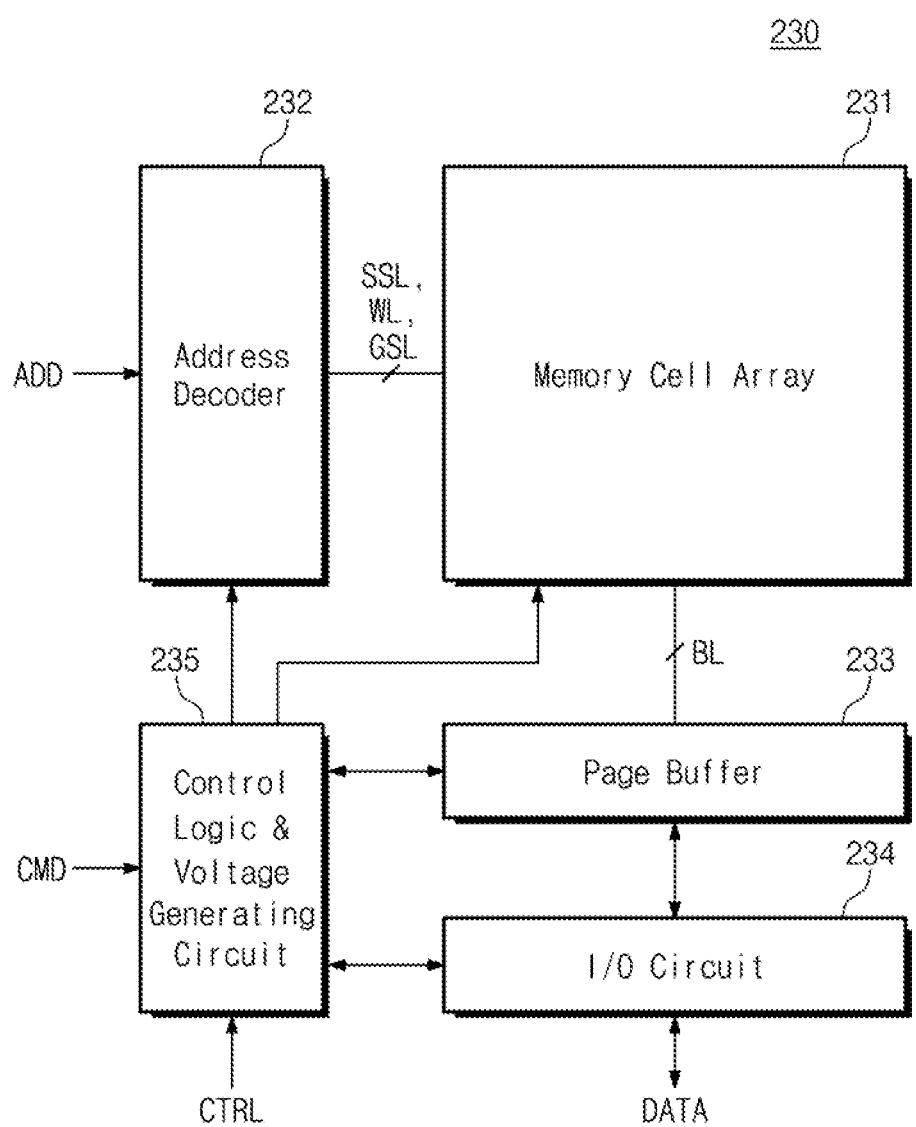
FIG. 16 is a block diagram illustrating a nonvolatile memory described with reference to FIG. 1, according to an exemplary embodiment of the inventive concept.

FIG. 16 is a block diagram illustrating a nonvolatile memory described with reference to FIG. 1 according to an exemplary embodiment of the inventive concept. The functionality and characteristics of a nonvolatile memory (e.g., nonvolatile memory 230, 240 . . . 250) of FIG. 1 will be described herein. Referring to FIG. 16, a nonvolatile memory device 230, 240 . . . 250 may include a memory cell array 231, an address decoder 232, a control logic and voltage generating circuit 235, a page buffer 233, and an input/output (I/O) circuit 234.

The memory cell array 231 may include a plurality of memory blocks. Each of the memory blocks may include a plurality of cell strings, and each of the cell strings may include a plurality of memory cells. The memory cells may be connected with a plurality of word lines WL. Each memory cell may be, for example, a single level cell (SLC) storing one bit or a multi-level cell (MLC) storing at least two bits.

The address decoder 232 may be connected with the memory cell array 231 through the word lines WL, string selection lines SSL, and ground selection lines GSL. The address decoder 232 may receive and decode a physical address ADD from an external device (e.g., the processing unit 110) and may drive the word lines based on the decoding result. For example, the address decoder 232 may decode a physical address ADD received from the external device, may select at least one of the word lines based on the decoded physical address ADD, and may drive the selected word line.

The control logic and voltage generating circuit 235 may control the address decoder 232, the page buffer 233, and the input/output circuit 234 in response to a storage command CMD and a control signal CTRL from the external device. For example, according to exemplary embodiments, the control logic and voltage generating circuit 235 may control other components in response to the signals CMD and CTRL such that data is stored in the memory cell array 231, or such that data stored in the memory cell array 231 is transmitted to the external device.

The page buffer 233 may be connected to the memory cell array 231 through bit lines BL. Under control of the control logic and voltage generating circuit 235, the page buffer 233 may control the bit lines BL such that data provided from the input/output circuit 234 is stored in the memory cell array 231. Under control of the control logic and voltage generating circuit 235, the page buffer 233 may read data stored in the memory cell array 231 and may provide the read data to the input/output circuit 234. For example, the page buffer 233 may be provided with data from the input/output circuit 234 by the page or may read data from the memory cell array 231 by the page.

The input/output circuit 234 may receive data from the external device and may transfer the received data to the page buffer 233. Alternatively, the input/output circuit 234 may receive data from the page buffer 233 and may transmit the received data to the external device. For example, the input/output circuit 234 may exchange data with the external device in synchronization with the control signal CTRL.

The control logic and voltage generating circuit 235 may generate various voltages used by the nonvolatile memory 230 to operate. For example, the control logic and voltage generating circuit 235 may generate a plurality of program voltages, a plurality of pass voltages, a plurality of verification voltages, a plurality of selection read voltages, a plurality of non-selection read voltages, a plurality of erase voltages, etc. The control logic and voltage generating circuit 235 may provide the generated voltages to the address decoder 232 or to a substrate of the memory cell array 231.

Figure 17:
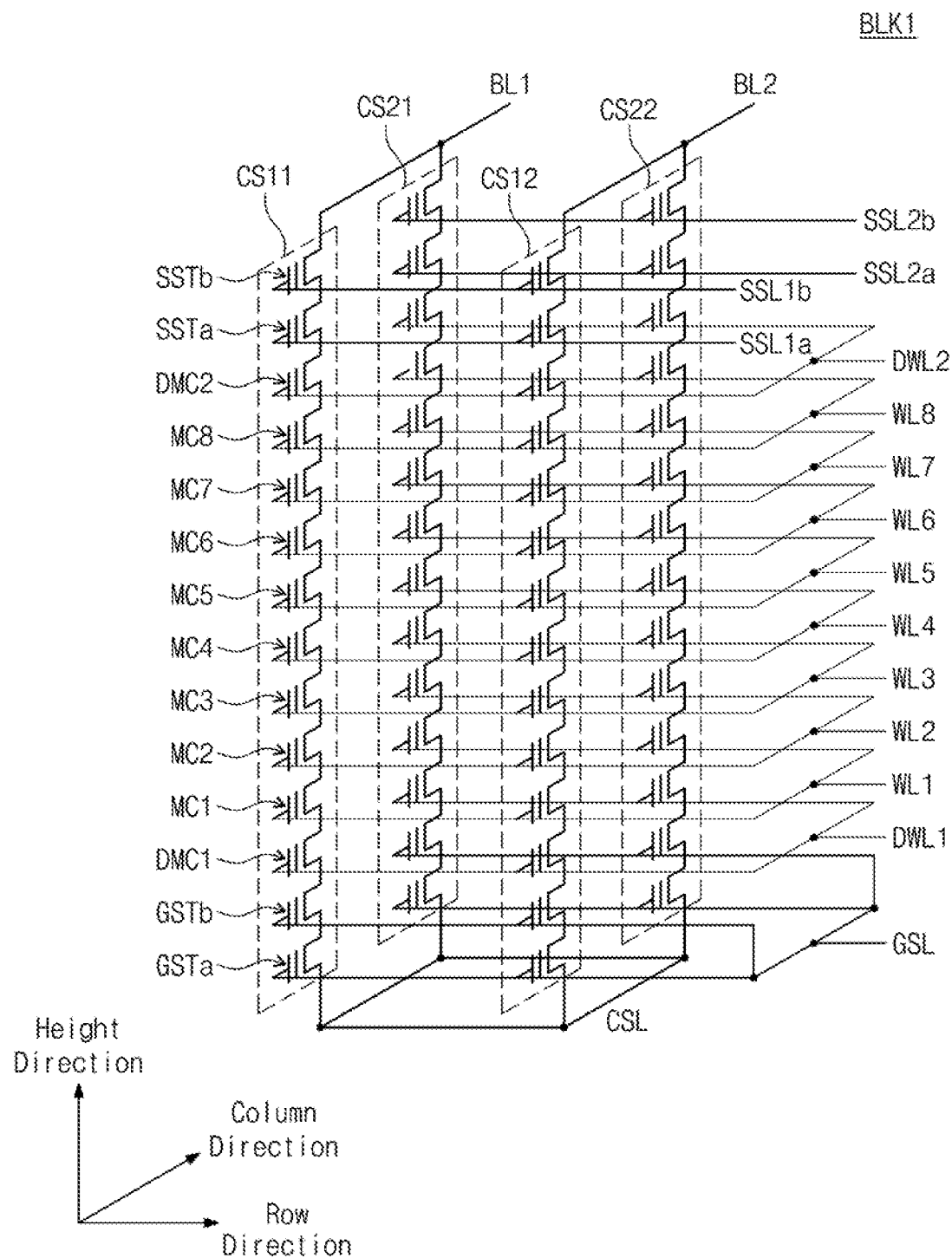
FIG. 17 is a circuit diagram illustrating a first memory block of memory blocks included in a memory cell array of FIG. 16 according to an exemplary embodiment of the inventive concept.

FIG. 17 is a circuit diagram illustrating a first memory block of memory blocks included in a memory cell array of FIG. 16 according to an exemplary embodiment of the inventive concept. A first memory block BLK1 having a three-dimensional structure according to an exemplary embodiment will be described with reference to FIG. 17. However, exemplary embodiments of the inventive concept are not limited thereto. For example, other types of memory blocks respectively included in the nonvolatile memory device 230, 240 . . . 250 may have a similar structure to that of the first memory block BLK1.

Referring to FIG. 17, the first memory block BLK1 may include a plurality of cell strings CS11, CS12, CS21, and CS22. The cell strings CS11, CS12, CS21, and CS22 may be arranged along a row direction, and a column direction and may form rows and columns.

For example, the cell strings CS11 and CS12 may be connected to string selection lines SSL1a and SSL1b to form a first row. The cell strings CS21 and CS22 may be connected to string selection lines SSL2a and SSL2b to form a second row.

For example, the cell strings CS11 and CS21 may be connected to a first bit line BL1 to form a first column. The cell strings CS12 and CS22 may be connected to a second bit line BL2 to form a second column.

Each of the cell strings CS11, CS12, CS21, and CS22 may include a plurality of cell transistors. Each of the cell strings CS11, CS12, CS21, and CS22 may include string selection transistors SSTa and SSTb, a plurality of memory cells MC1 to MC8, ground selection transistors GSTa and GSTb, and dummy memory cells DMC1 and DMC2.

In an exemplary embodiment, each of the memory cells included in the cell strings CS11, CS12, CS21, and CS22 may be, for example, a charge trap flash (CTF) memory cell.

The memory cells MC1 to MC8 may be serially connected and may be stacked in a height direction, which is a direction substantially perpendicular to a plane defined by a row direction and a column direction. The string selection transistors SSTa and SSTb may be serially connected and may be disposed between the memory cells MC1 to MC8 and a bit line BL. The ground selection transistors GSTa and GSTb may be serially connected and may be disposed between the memory cells MC to MC8 and a common source line CSL.

In an exemplary embodiment, the first dummy memory cell DMC1 may be disposed between the memory cells MC1 to MC8 and the ground selection transistors GSTa and GSTb. In an exemplary embodiment, the second dummy memory cell DMC2 may be disposed between the memory cells MC1 to MC8 and the string selection transistors SSTa and SSTb.

The ground selection transistors GSTa and GSTb of the cell strings CS11, CS12, CS21, and CS22 may be connected in common to a ground selection line GSL.

In an exemplary embodiment, ground selection transistors in the same row may be connected to the same ground selection line, and ground selection transistors in different rows may be connected to different ground selection lines. For example, the first ground selection transistors GSTa of the cell strings CS11 and CS12 in the first row may be connected to the first ground selection line, and the first ground selection transistors GSTa of the cell strings CS21 and CS22 in the second row may be connected to the second ground selection line.

In an exemplary embodiment, ground selection transistors at substantially the same height from a substrate may be connected to the same ground selection line, and ground selection transistors at different heights therefrom may be connected to different ground selection lines. For example, the first ground selection transistors GSTa of the cell strings CS11, CS12, CS21, and CS22 may be connected to the first ground selection line, and the second ground selection transistors GSTb thereof may be connected to the second ground selection line.

Memory cells placed at substantially the same height from the substrate (or the ground selection transistors GSTa and GSTb) may be connected in common to the same word line, and memory cells placed at different heights therefrom may be connected to different word lines. For example, memory cells MC1 to MC8 of the cell strings CS11, CS12, CS21, and CS22 may be connected in common to first to eighth word lines WL1 to WL8.

String selection transistors belonging to the same row from among the first string selection transistors SSTa placed at substantially the same height may be connected to the same string selection line, and string selection transistors belonging to different rows may be connected to different string selection lines. For example, the first string selection transistors SSTa of the cell strings CS11 and CS12 in the first row may be connected in common to the string selection line SSL1a, and the first string selection transistors SSTa of the cell strings CS21 and CS22 in the second row may be connected in common to the string selection line SSL1a.

String selection transistors belonging to the same row from among the second string selection transistors SSTb at substantially the same height may be connected to the same string selection line, and string selection transistors belonging to different rows may be connected to different string selection lines. For example, the second string selection transistors SSTb of the cell strings CS11 and CS12 in the first row may be connected in common to the string selection line SSL1b, and the second string selection transistors SSTb of the cell strings CS21 and CS22 in the second row may be connected in common to the string selection line SSL2b.

String selection transistors of cell strings in the same row may be connected in common to the same string selection line. For example, the first and second string selection transistors SSTa and SSTb of the cell strings CS11 and CS12 in the first row may be connected in common to the same string selection line. The first and second string selection transistors SSTa and SSTb of the cell strings CS21 and CS22 in the second row may be connected in common to the same string selection line.

In an exemplary embodiment, dummy memory cells at substantially the same height may be connected with the same dummy word line, and dummy memory cells at different heights may be connected with different dummy word lines. For example, the first dummy memory cells DMC1 may be connected to a first dummy word line DWL1, and the second dummy memory cells DMC2 may be connected to a second dummy word line DWL2.

In the first memory block BLK1, read and write operations may be performed by the row. For example, one row of the memory block BLK1 may be selected by the string selection lines SSL1a, SSL1b, SSL2a, and SSL2b.

The cell strings CS11 and CS12 in the first row may be respectively connected to the bit lines BL1 and BL2 when a turn-on voltage is supplied to the string selection lines SSL1a and SSL1b and a turn-off voltage is supplied to the string selection lines SSL2a and SSL2b. The cell strings CS21 and CS22 in the second row may be respectively connected to the bit lines BL1 and BL2 when the turn-on voltage is supplied to the string selection lines SSL2a and SSL2b and the turn-off voltage is supplied to the string selection lines SSL1a and SSL1b. As a word line is driven, memory cells placed at substantially the same height from among memory cells in cell strings connected to the driven word line may be selected. Read and write operations may be performed with respect to the selected memory cells. The selected memory cells may form a physical page.

In the memory block BLK1, memory cells may be erased by the memory block or by the sub-block. When erasing is performed by the memory block, all memory cells MC in the memory block BLK1 may be simultaneously erased according to an erase request. When erasing is performed by the sub-block, a portion of memory cells MC in the memory block BLK1 may be simultaneously erased according to an erase request, and the others thereof may be erase-inhibited. A low voltage (e.g., a ground voltage) may be supplied to a word line connected to erased memory cells MC, and a word line connected to erase-inhibited memory cells MC may be floated.

The first memory block BLK1 illustrated in FIG. 17 is exemplary. For example, the number of cell strings may increase or decrease, and the number of rows of cell strings and the number of columns of cell strings may increase or decrease according to the number of cell strings. In the first memory block BLK1, the number of cell strings (GST, MC, DMC, SST, etc.) may increase or decrease, and a height of the first memory block BLK1 may increase or decrease according to the number of cell strings (GST, MC, DMC, SST, etc.). Furthermore, the number of lines (GSL, WL, DWL, SSL, etc.) connected with cell transistors may increase or decrease according to the number of cell strings (GST, MC, DMC, SST, etc.).

Figure 18:
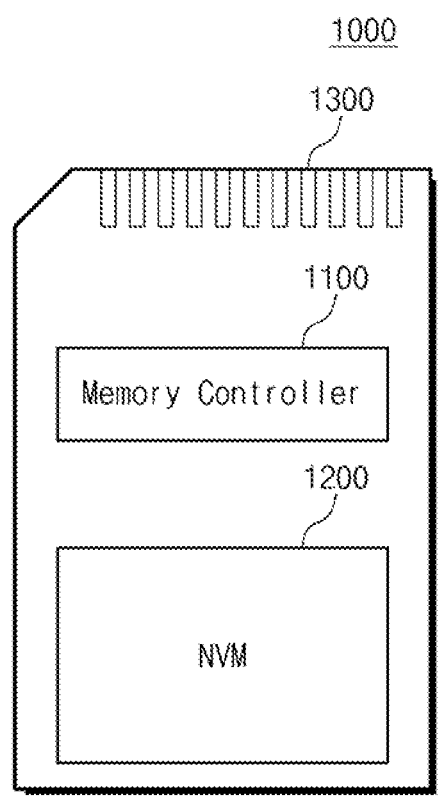
FIG. 18 is a block diagram illustrating a memory card system including a nonvolatile memory system according to an exemplary embodiment of the inventive concept.

FIG. 18 is a block diagram illustrating a memory card system including a nonvolatile memory system according to an exemplary embodiment of the inventive concept. Referring to FIG. 18, a memory card system 1000 may include a memory controller 1100, a nonvolatile memory 1200, and a connector 1300.

The memory controller 1100 may be connected to the nonvolatile memory 1200. The memory controller 1100 may be configured to access the nonvolatile memory 1200. For example, the memory controller 1100 may be adapted to control an overall operation of the nonvolatile memory 1200 including, but not limited to, a read operation, a write operation, an erase operation, and a background operation. The background operation may include, but is not limited to, wear-leveling management, garbage collection, etc. In an exemplary embodiment, the memory controller 1100 may generate an interrupt based on a method described above with reference to FIGS. 1 to 15.

The memory controller 1100 may provide an interface between the nonvolatile memory 1200 and a host. The memory controller 1100 may be configured to drive firmware for controlling the nonvolatile memory 1200. In an exemplary embodiment, the memory controller 1100 may include components such as, but not limited to, a RAM, a processing unit, a host interface, a memory interface, and an error correction unit.

The memory controller 1100 may communicate with an external device through the connector 1300. The memory controller 1100 may communicate with an external device based on a specific communication protocol. For example, the memory controller 1100 may communicate with the external device through at least one of various communication protocols such as, but not limited to, universal serial bus (USB), multimedia card (MMC), eMMC (embedded MMC), peripheral component interconnection (PCI), PCI-express (PCI-E), advanced technology attachment (ATA), a serial-ATA, parallel-ATA, small computer small interface (SCSI), enhanced small disk interface (ESDI), integrated drive electronics (IDE), Firewire, universal flash storage (UFS), nonvolatile memory express (NVMe), etc. In an exemplary embodiment, a write command defined by the above-described standards may include, for example, size information of write data.

The nonvolatile memory 1200 may be implemented with a variety of nonvolatile memory devices such as, but not limited to, an electrically erasable and programmable ROM (EEPROM), a NAND flash memory, a NOR flash memory, a phase-change RAM (PRAM), a resistive RAM (ReRAM), a ferroelectric RAM (FRAM), a spin-torque magnetic RAM (STT-MRAM), etc.

In an exemplary embodiment, the memory controller 1100 and the nonvolatile memory 1200 may be integrated in a single semiconductor device. For example, the memory controller 1100 and the nonvolatile memory 1200 may be integrated in a single semiconductor device to form a solid state drive (SSD). The memory controller 1100 and the nonvolatile memory 1200 may be integrated in a single semiconductor device to form a memory card. For example, the controller 1100 and the nonvolatile memory 1200 may be integrated in a single semiconductor device to form a memory card such as, but not limited to, a PC card (a personal computer memory card international association (PCMCIA) card), a compact flash card (CF), a smart media card (SM, SMC), a memory stick, a multimedia card (MMC, RS-MMC, MMCmicro), an SD card (SD, miniSD, microSD, SDHC), and a universal flash storage (UFS).

Figure 19:
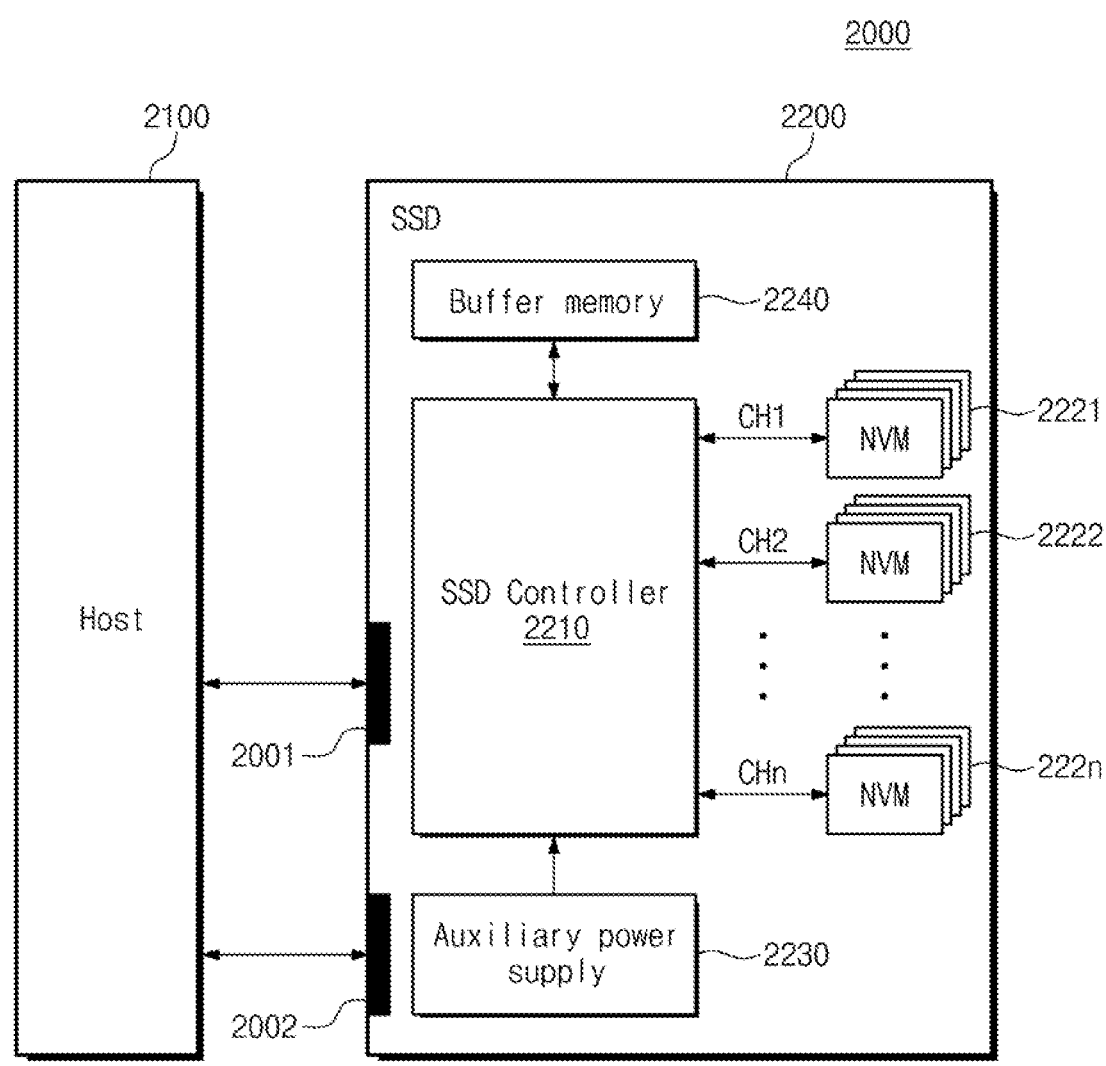
FIG. 19 is a block diagram illustrating a solid state drive including a nonvolatile memory system according to an exemplary embodiment of the inventive concept.

FIG. 19 is a block diagram illustrating a solid state drive including a nonvolatile memory system according to an exemplary embodiment of the inventive concept. Referring to FIG. 17, a solid state drive (SSD) system 2000 may include a host 2100 and an SSD 2200. The SSD 2200 may exchange signals with the host 2100 through a host interface 2001 and may be supplied with power through a power connector 2002. The SSD 2200 may include, for example, an SSD controller 2210, a plurality of flash memories 2221 to 222n connected to the SSD controller 2210 via channels CH1 to CHn, an auxiliary power supply 2230, and a buffer memory 2240.

The SSD controller 2210 may control the flash memories 2221 to 222n in response to a signal from the host 2100. In an exemplary embodiment, the SSD controller 2210 may generate an interrupt based on a method described above with reference to FIGS. 1 to 15.

The auxiliary power supply 2230 may be connected to the host 2100 via the power connector 2002. The auxiliary power supply 2230 may be charged by power from the host 2100. When power is not stably supplied from the host 2100, the auxiliary power supply 2230 may power the SSD system 2000. The auxiliary power supply 2230 may be placed inside or outside the SSD 2200. For example, the auxiliary power supply 2230 may be disposed on a main board to supply auxiliary power to the SSD 2200.

The buffer memory 2240 may act as a buffer memory of the SSD 2200. For example, the buffer memory 2240 may temporarily store data received from the host 2100 or from the flash memories 2221 to 222n, and may temporarily store metadata (e.g., mapping tables) of the flash memories 2221 to 222n. The buffer memory 2240 may include volatile memories such as, for example, a dynamic random-access memory (DRAM), a synchronous DRAM (SDRAM), a double data rate SDRAM (DDR SDRAM), a low power double data rate SDRAM (LPDDR SDRAM), a static random-access memory (SRAM), etc., or nonvolatile memories such as, for example, a ferroelectric RAM (FRAM), a resistive random-access memory (ReRAM), a spin-transfer torque magnetic random-access memory (STT-MRAM), a parameter random access memory (PRAM), etc.

Figure 20:
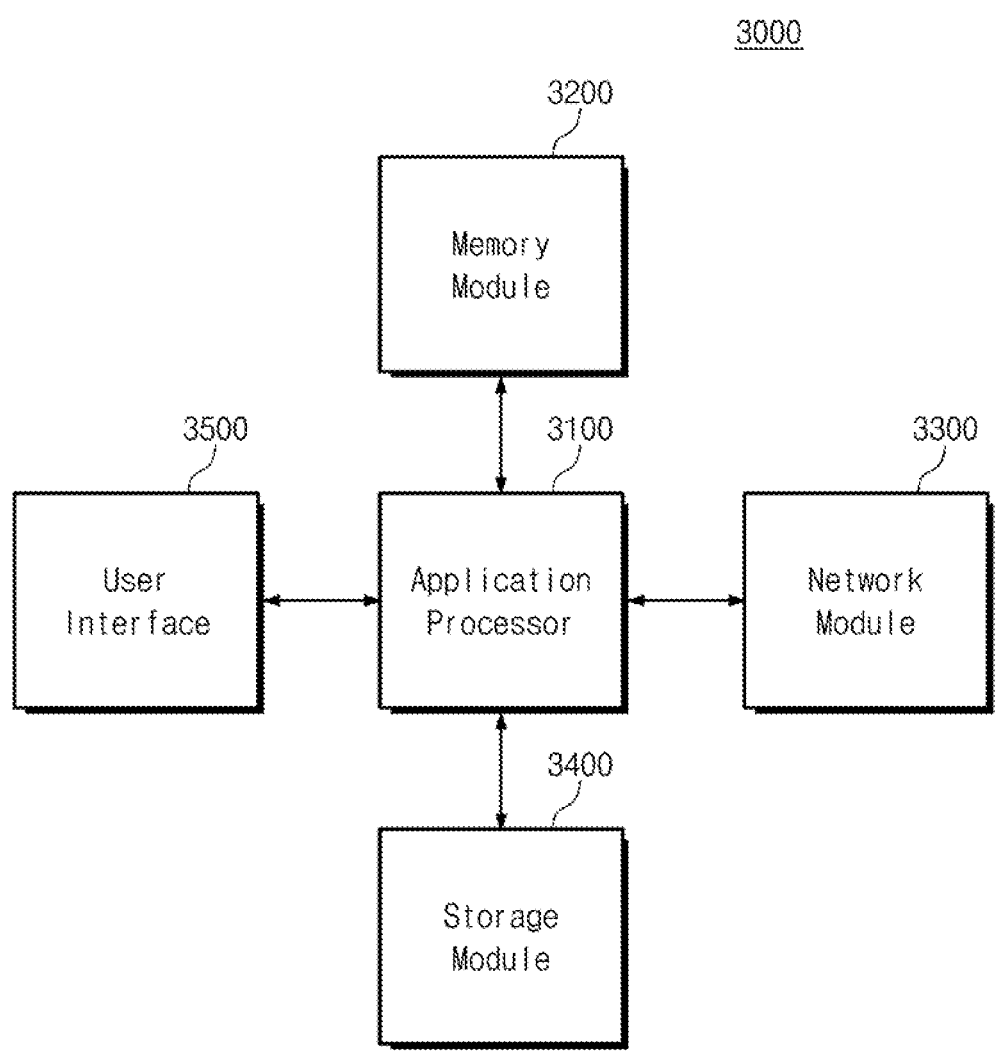
FIG. 20 is a block diagram illustrating a user system including a nonvolatile memory system according to an exemplary embodiment of the inventive concept.

FIG. 20 is a block diagram illustrating a user system including a nonvolatile memory system according to an exemplary embodiment of the inventive concept. Referring to FIG. 20, a user system 3000 may include, for example, an application processor 3100, a memory module 3200, a network module 3300, a storage module 3400, and a user interface 3500.

The application processor 3100 may drive components, an operating system, etc., of the user system 3000. For example, the application processor 3100 may include controllers for controlling components of the user system 3000 such as, for example, graphics engines, a variety of interfaces, etc. For example, the application processor 3100 may be a system-on-chip (SoC).

The memory module 3200 may operate as, for example, a main memory, a working memory, a buffer memory, or a cache memory of the user system 3000. The memory module 3200 may be implemented with a volatile random access memory such as, for example, DRAM, SDRAM, DDR SDRAM, DDR2 SDRAM, DDR3 SDRAM, LPDDR DRAM, LPDDR2 DRAM, or LPDDR3 DRAM, or a nonvolatile random access memory such as, for example, PRAM, MRAM, RRAM, or FRAM.

The network module 3300 may communicate with external devices. For example, the network module 3300 may support wireless communications, such as code division multiple access (CDMA), global system for mobile communication (GSM), wideband CDMA (WCDMA), CDMA-2000, time division multiple access (TDMA), long term evolution (LTE), Wimax, WLAN, UWB, Bluetooth, WI-DI, etc. In an exemplary embodiment, the network module 3300 may be included in the application processor 3100.

The storage module 3400 may store data. For example, the storage module 3400 may store data received from the application processor 3100. Alternatively, the storage module 3400 may provide the application processor 3100 with data stored therein. For example, the storage module 3400 may be implemented with a semiconductor memory device such as PRAM, MRAM, RRAM, NAND flash memory, NOR flash memory, or a three-dimensional NAND flash memory.

In an exemplary embodiment of the present inventive concept, a three dimensional (3D) memory array is provided. The 3D memory array is monolithically formed in one or more physical levels of arrays of memory cells having an active area disposed above a silicon substrate and circuitry associated with the operation of those memory cells, whether such associated circuitry is above or within such substrate. The term "monolithic" means that layers of each level of the array are directly deposited on the layers of each underlying level of the array. In an exemplary embodiment of the present inventive concept, the 3D memory array includes vertical NAND strings that are vertically oriented such that at least one memory cell is located over another memory cell. The at least one memory cell may comprise a charge trap layer. The following patent documents, which are hereby incorporated by reference, describe suitable configurations for three-dimensional memory arrays, in which the three-dimensional memory array is configured as a plurality of levels, with word lines and/or bit lines shared between levels: U.S. Pat. Nos. 7,679,133; 8,553,466; 8,654,587; 8,559,235; and US Pat. Pub. No. 2011/0233648.

In an exemplary embodiment, the storage module 3400 may generate an interrupt based on a method described with reference to FIGS. 1 to 15. The storage module 3400 may communicate with the application processor 3100 based on a given interface. The storage module 3400 may adjust a time taken to perform garbage collection based on a write command from the application processor 3100.

The user interface 3500 may include interfaces which input data or a command in the application processor 3100 or output data to an external device. For example, the user interface 3500 may include user input interfaces such as a keyboard, a keypad, buttons, a touch panel, a touch screen, a touch pad, a touch ball, a camera, a microphone, a gyroscope sensor, a vibration sensor, etc. The user interface 3500 may further include user output interfaces such as a liquid crystal display (LCD), an organic light-emitting diode (OLED) display device, an active matrix OLED (AMO-LED) display device, a light-emitting diode (LED), a speaker, a motor, etc.

A nonvolatile memory device, a card controller, and a memory card according to exemplary embodiments of the inventive concept may be packaged according to any of a variety of different packaging technologies. Examples of such packaging technologies include, but are not limited to, package on package (PoP), ball grid arrays (BGAs), chip scale packages (CSPs), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), small outline (SOIC), shrink small outline package (SSOP), thin small outline (TSOP), thin quad flatpack (TQFP), system in package (SIP), multi-chip package (MCP), wafer-level fabricated package (WFP), and wafer-level processed stack package (WSP).

According to exemplary embodiments of the inventive concept, the number of events that generate an interrupt may be reduced, resulting in improved performance of a storage device (e.g., an SSD) due to decreased accumulation of interrupts.

While the present inventive concept has been described with reference to the exemplary embodiments thereof, it will be understood by those of ordinary skill in the art that various changes and modifications may be made without departing from the spirit and scope of the present inventive concept as defined by the following claims.

What is claimed is:

1. A method of operating a storage device, comprising:
executing a command provided by a host;
writing a completion entry corresponding to the executed command to a completion queue of the host;
delaying issuing an interrupt based on a status of performance of the host, or a status of performance of the storage device; and
issuing the interrupt when a first mismatch occurs between a tail pointer TP and a head pointer HP of the second completion queue, and when a time elapsing from a point in time when the first mismatch occurs exceeds a reference time.

2. The method of claim 1, further comprising receiving a tail doorbell indicating that a new command is recorded at a submission queue prior to executing the command.

3. The method of claim 2, further comprising fetching the command from the submission queue of the host prior to executing the command.

4. The method of claim 1, wherein the storage device communicates with the host via a nonvolatile memory express (NVMe) interface.

5. The storage device of claim 1, wherein the storage device communicates with the host based on at least one of a Universal Serial Bus (USB) interface, a Small Computer System Interface (SCSI), a Peripheral Component Express (PCI Express) interface, an Advanced Technology Attachment (ATA) interface, a Parallel ATA (PATA) interface, a Serial ATA (SATA) interface, and a Serial Attached SCSI (SAS) interface.

6. A storage device, comprising:
a nonvolatile memory device; and
a storage controller connected to the nonvolatile memory device, wherein the storage controller is configured to:
fetch a first command from a first submission queue corresponding to a first application and a second command from a second submission queue corresponding to a second application;
execute the first command and the second command;
write a first completion entry corresponding to the first executed command to a first completion queue corresponding to the first application and a second completion entry corresponding to the second executed command to a second completion queue corresponding to the second application;
delay issuing an interrupt, wherein the delay is based on a status of performance of a host, or a status of performance of the storage device; and issue the interrupt when a first mismatch occurs between a tail pointer TP and a head pointer HP of the second completion queue, and when a time elapsing from a point in time when the first mismatch occurs exceeds a reference time.

7. The storage device of claim 6, wherein the storage controller is further configured to issue the interrupt when a reference elapsed time elapses after issuing of a previous interrupt, wherein a reference elapsed time is based on the status or performance of the host, or the status or performance of the storage device.

8. The storage device of claim 6, wherein the storage controller is further configured to issue the interrupt when a difference value (TP–HP) between the tail pointer TP and the head pointer HP of the second completion queue of the host is '1'.

9. The storage device of claim 8, wherein the storage controller is further configured to issue the interrupt when the difference value (TP–HP) changes from '0' to '1'.

10. The storage device of claim 8, wherein the storage controller is further configured to issue the interrupt when the difference value (TP–HP) is equal to an aggregation threshold.

11. The storage device of claim 8, wherein the storage controller is further configured to receive the head pointer from the host.

12. The storage device of claim 6, wherein the interrupt is a pin-base signal or is transferred in a message signaled interrupt (MSI) manner or an MSI-X manner.

13. A storage device comprising:
a nonvolatile memory device;
means for executing a command;
means for writing a completion entry corresponding to the executed command to a completion queue of a host; and
means for delaying issuing an interrupt based on a status of performance of the host, or a status of performance of the storage device; and
means for issuing the interrupt when a first mismatch occurs between a tail pointer TP and a head pointer HP of the second completion queue, and when a time elapsing from a point in time when the first mismatch occurs exceeds a reference time.

14. The storage device of claim 13, further comprising:
means for receiving a tail doorbell indicating that a new command is recorded at a submission queue prior to executing the command; and
means for fetching the command from the submission queue of the host prior to executing the command.

15. The storage device of claim 13, further comprising:
means for issuing the interrupt when a number of entries of the completion queue that are not processed by the host is equal to the first mismatch value,
wherein the number of entries is determined by calculating a difference between the tail pointer TP and the head pointer HP of the completion queue.

16. The storage device of claim 15, further comprising:
means for issuing the interrupt when the number of entries changes from '0' to '1'.

* * * * *